(12) United States Patent
Hitzinger

(10) Patent No.: US 10,899,340 B1
(45) Date of Patent: Jan. 26, 2021

(54) VEHICLE WITH AUTOMATED SUBSYSTEMS

(71) Applicant: Alexander Hitzinger, Mountain View, CA (US)

(72) Inventor: Alexander Hitzinger, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 138 days.

(21) Appl. No.: 15/992,679

(22) Filed: May 30, 2018

Related U.S. Application Data

(60) Provisional application No. 62/523,012, filed on Jun. 21, 2017.

(51) Int. Cl.
*B60W 30/02* (2012.01)
*B60W 10/16* (2012.01)
(Continued)

(52) U.S. Cl.
CPC ............ *B60W 30/02* (2013.01); *B60W 10/14* (2013.01); *B60W 10/16* (2013.01); *B60W 10/18* (2013.01); *B60W 10/20* (2013.01); *B60W 10/22* (2013.01)

(58) Field of Classification Search
CPC ...... B60W 30/02; B60W 10/20; B60W 10/22; B60W 10/18; B60W 10/16; B60W 10/14
See application file for complete search history.

(56) References Cited

U.S. PATENT DOCUMENTS 3,781,032 A 12/1973 Jones
4,530,514 A 7/1985 Ito
(Continued)

FOREIGN PATENT DOCUMENTS

CN 108215946 A 6/2018
CN 208439009 U 1/2019
(Continued)

OTHER PUBLICATIONS porsche.com, "Porsche AG: Porsche 918 RSR—Racing Laboratory With Even Higher-Performance Hybrid Drive—Porsche USA", Current Press Releases dated Jan. 10, 2011, Downloaded Mar. 13, 2017, www.porsche.com/usa/aboutporsche/pressreleases/pag/?pool=international-de&id-2011-01-10, 6 pp.

(Continued)

*Primary Examiner* — Michael V Kerrigan
(74) *Attorney, Agent, or Firm* — Young Basile Hanlon & MacFarlane, P.C.

(57) ABSTRACT

A vehicle includes a vehicle body and road wheels that are connected to the vehicle body. A propulsion system is operable to independently control propulsion torque to each of the road wheels. A steering system is operable to independently control a steering angle of each of the road wheels. A braking system that is operable to independently control braking torque to each of the road wheels. An active suspension system regulates motion of the road wheels with respect to the vehicle body by independently controlling application of force to each of the road wheels. A vehicle control module is operable to determine a desired chassis-level motion, determine a control strategy to achieve the desired chassis-level motion, and output commands to each of the propulsion system, the steering system, the braking system, and the active suspension system to achieve the desired chassis-level motion.

20 Claims, 15 Drawing Sheets

(51) Int. Cl.
  *B60W 10/22* (2006.01)
  *B60W 10/20* (2006.01)
  *B60W 10/18* (2012.01)
  *B60W 10/14* (2012.01)

(56) References Cited

U.S. PATENT DOCUMENTS

| | | | |
|---|---|---|---|
| 4,537,420 A | 8/1985 | Ito et al. | |
| 4,589,678 A | 5/1986 | Lund | |
| 4,613,152 A | 9/1986 | Booher | |
| 4,634,142 A | 1/1987 | Woods et al. | |
| 4,637,628 A | 1/1987 | Perkins | |
| 4,784,378 A | 11/1988 | Ford | |
| 4,834,416 A | 5/1989 | Shimoe et al. | |
| 4,893,832 A | 1/1990 | Booher | |
| 4,922,159 A | 5/1990 | Phillips et al. | |
| 4,960,290 A | 10/1990 | Bose | |
| 4,981,309 A | 1/1991 | Froeschle et al. | |
| 4,991,698 A | 2/1991 | Hanson | |
| 5,033,028 A | 7/1991 | Browning | |
| 5,060,959 A | 10/1991 | Davis et al. | |
| 5,244,053 A | 9/1993 | Kashiwagi | |
| 5,401,053 A | 3/1995 | Sahm et al. | |
| 5,409,254 A | 4/1995 | Minor et al. | |
| 5,468,055 A | 11/1995 | Simon et al. | |
| 5,507,518 A | 4/1996 | Nakahara et al. | |
| 5,517,414 A | 5/1996 | Hrovat | |
| 5,678,847 A | 10/1997 | Izawa et al. | |
| 5,810,335 A | 9/1998 | Wirtz et al. | |
| 5,829,764 A | 11/1998 | Griffiths | |
| 5,880,542 A | 3/1999 | Leary et al. | |
| 6,032,770 A | 3/2000 | Alcone et al. | |
| 6,113,119 A | 9/2000 | Laurent et al. | |
| 6,170,838 B1 | 1/2001 | Laurent et al. | |
| 6,249,728 B1 | 6/2001 | Streiter | |
| 6,357,770 B1 | 3/2002 | Carpiaux et al. | |
| 6,364,078 B1 | 4/2002 | Parison et al. | |
| 6,443,436 B1 | 9/2002 | Schel | |
| 6,470,248 B2 | 10/2002 | Shank et al. | |
| 6,502,837 B1 | 1/2003 | Hamilton et al. | |
| 6,634,445 B2 | 10/2003 | Dix et al. | |
| 6,873,891 B2 | 3/2005 | Moser et al. | |
| 6,926,288 B2 | 8/2005 | Bender | |
| 6,940,248 B2 | 9/2005 | Maresca et al. | |
| 6,945,541 B2 | 9/2005 | Brown | |
| 7,017,690 B2 | 3/2006 | Burke | |
| 7,032,723 B2 | 4/2006 | Quaglia et al. | |
| 7,051,851 B2 | 5/2006 | Svartz et al. | |
| 7,140,601 B2 | 11/2006 | Nesbitt et al. | |
| 7,195,250 B2 | 3/2007 | Knox et al. | |
| 7,202,577 B2 | 4/2007 | Parison et al. | |
| 7,302,825 B2 | 12/2007 | Knox | |
| 7,308,351 B2 | 12/2007 | Knoop et al. | |
| 7,392,997 B2 | 7/2008 | Sanville et al. | |
| 7,401,794 B2 | 7/2008 | Laurent et al. | |
| 7,421,954 B2 | 9/2008 | Bose | |
| 7,427,072 B2 | 9/2008 | Brown | |
| 7,484,744 B2 | 2/2009 | Galazin et al. | |
| 7,502,589 B2 | 3/2009 | Howard et al. | |
| 7,543,825 B2 | 6/2009 | Yamada | |
| 7,551,749 B2 | 6/2009 | Rosen et al. | |
| 7,641,010 B2 | 1/2010 | Mizutani et al. | |
| 7,644,938 B2 | 1/2010 | Yamada | |
| 7,654,540 B2 | 2/2010 | Parison et al. | |
| 7,818,109 B2 | 10/2010 | Scully | |
| 7,823,891 B2 | 11/2010 | Bushko et al. | |
| 7,932,684 B2 | 4/2011 | O'Day et al. | |
| 7,962,261 B2 | 6/2011 | Bushko et al. | |
| 7,963,529 B2 | 6/2011 | Oteman et al. | |
| 7,976,038 B2 | 7/2011 | Gregg | |
| 8,047,551 B2 | 11/2011 | Morris et al. | |
| 8,067,863 B2 | 11/2011 | Giovanardi | |
| 8,095,268 B2 | 1/2012 | Parison et al. | |
| 8,099,213 B2 | 1/2012 | Zhang et al. | |
| 8,109,371 B2 | 2/2012 | Kondo et al. | |
| 8,112,198 B2 | 2/2012 | Parison, Jr. et al. | |
| 8,113,522 B2 | 2/2012 | Oteman et al. | |
| 8,127,900 B2 | 3/2012 | Inoue | |
| 8,157,036 B2 | 4/2012 | Yogo et al. | |
| 8,191,874 B2 | 6/2012 | Inoue et al. | |
| 8,282,149 B2 | 10/2012 | Kniffin et al. | |
| 8,336,319 B2 | 12/2012 | Johnston et al. | |
| 8,356,861 B2 | 1/2013 | Kniffin et al. | |
| 8,360,387 B2 | 1/2013 | Breen et al. | |
| 8,370,022 B2 | 2/2013 | Inoue et al. | |
| 8,387,762 B2 | 3/2013 | Kondo et al. | |
| 8,417,417 B2 | 4/2013 | Chen et al. | |
| 8,428,305 B2 | 4/2013 | Zhang et al. | |
| 8,466,639 B2 | 6/2013 | Parison, Jr. et al. | |
| 8,490,761 B2 | 7/2013 | Kondo | |
| 8,499,903 B2 | 8/2013 | Sakuta et al. | |
| 8,548,678 B2 | 10/2013 | Ummethala et al. | |
| 8,579,311 B2 | 11/2013 | Butlin, Jr. et al. | |
| 8,641,052 B2 | 2/2014 | Kondo et al. | |
| 8,641,053 B2 | 2/2014 | Pare et al. | |
| 8,668,060 B2 | 3/2014 | Kondo et al. | |
| 8,682,530 B2 | 3/2014 | Nakamura | |
| 8,701,845 B2 | 4/2014 | Kondo | |
| 8,725,351 B1 | 5/2014 | Selden et al. | |
| 8,744,680 B2 | 6/2014 | Rieger et al. | |
| 8,744,694 B2 | 6/2014 | Ystueta | |
| 8,757,309 B2 | 6/2014 | Schmitt et al. | |
| 8,783,430 B2 | 7/2014 | Brown | |
| 8,890,461 B2 | 11/2014 | Knox et al. | |
| 8,938,333 B2 | 1/2015 | Bose et al. | |
| 9,062,983 B2 | 6/2015 | Zych | |
| 9,079,473 B2 | 7/2015 | Lee et al. | |
| 9,102,209 B2 | 8/2015 | Giovanardi et al. | |
| 9,291,300 B2 | 3/2016 | Parker et al. | |
| 9,316,667 B2 | 4/2016 | Ummethala et al. | |
| 9,349,304 B2 | 5/2016 | Sangermano, II et al. | |
| 9,399,384 B2 | 7/2016 | Lee et al. | |
| 9,533,539 B2 | 1/2017 | Eng et al. | |
| 9,550,495 B2 | 1/2017 | Tatourian et al. | |
| 9,625,902 B2 | 4/2017 | Knox | |
| 9,643,467 B2 | 5/2017 | Selden et al. | |
| 9,702,349 B2 | 7/2017 | Anderson et al. | |
| 9,855,887 B1 | 1/2018 | Potter et al. | |
| 9,868,332 B2 | 1/2018 | Anderson et al. | |
| 9,975,391 B2 | 5/2018 | Tseng et al. | |
| 10,065,474 B2 | 9/2018 | Trangbaek | |
| 10,093,145 B1 | 10/2018 | Vaughan et al. | |
| 10,245,984 B2 | 4/2019 | Parker et al. | |
| 10,300,760 B1 | 5/2019 | Aikin et al. | |
| 10,315,481 B2 | 6/2019 | Lu et al. | |
| 10,377,371 B2 | 8/2019 | Anderson et al. | |
| 10,407,035 B1 * | 9/2019 | Gadda | B60T 8/1755 |
| 10,513,161 B2 | 12/2019 | Anderson et al. | |
| 2003/0030241 A1 | 2/2003 | Lawson | |
| 2004/0074720 A1 | 4/2004 | Thieltges | |
| 2004/0226788 A1 | 11/2004 | Tanner | |
| 2005/0051986 A1 | 3/2005 | Galazin et al. | |
| 2005/0096171 A1 | 5/2005 | Brown et al. | |
| 2005/0199457 A1 | 9/2005 | Beck | |
| 2005/0206231 A1 | 9/2005 | Lu et al. | |
| 2005/0247496 A1 | 11/2005 | Nagaya | |
| 2006/0043804 A1 | 3/2006 | Kondou | |
| 2006/0076828 A1 | 4/2006 | Lu et al. | |
| 2006/0119064 A1 | 6/2006 | Mizuno et al. | |
| 2006/0181034 A1 | 8/2006 | Wilde et al. | |
| 2006/0266599 A1 | 11/2006 | Denys et al. | |
| 2006/0273530 A1 | 12/2006 | Zuber | |
| 2007/0069496 A1 | 3/2007 | Rinehart et al. | |
| 2007/0107959 A1 | 5/2007 | Suzuki et al. | |
| 2007/0199750 A1 | 8/2007 | Suzuki et al. | |
| 2007/0210539 A1 | 9/2007 | Hakui et al. | |
| 2008/0017462 A1 | 1/2008 | Mizutani et al. | |
| 2008/0100020 A1 | 5/2008 | Gashi et al. | |
| 2008/0164111 A1 | 7/2008 | Inoue et al. | |
| 2008/0283315 A1 | 11/2008 | Suzuki et al. | |
| 2009/0033055 A1 | 2/2009 | Morris et al. | |
| 2009/0064808 A1 | 3/2009 | Parison et al. | |
| 2009/0095584 A1 | 4/2009 | Kondo et al. | |
| 2009/0120745 A1 | 5/2009 | Kondo et al. | |

(56) References Cited

U.S. PATENT DOCUMENTS

| | | |
|---|---|---|
| 2009/0121398 A1 | 5/2009 | Inoue |
| 2009/0173585 A1 | 7/2009 | Kappagantu |
| 2009/0174158 A1 | 7/2009 | Anderson et al. |
| 2009/0198419 A1 | 8/2009 | Clark |
| 2009/0218867 A1 | 9/2009 | Clark |
| 2009/0243402 A1 | 10/2009 | O'Day et al. |
| 2009/0243598 A1 | 10/2009 | O'Day |
| 2009/0273147 A1 | 11/2009 | Inoue et al. |
| 2009/0302559 A1 | 12/2009 | Doerfel |
| 2009/0321201 A1 | 12/2009 | Sakuta et al. |
| 2010/0044977 A1 | 2/2010 | Hughes et al. |
| 2010/0059959 A1 | 3/2010 | Kim |
| 2010/0207344 A1 | 8/2010 | Nakamura |
| 2010/0222960 A1 | 9/2010 | Oida et al. |
| 2010/0252376 A1 | 10/2010 | Chern et al. |
| 2011/0115183 A1 | 5/2011 | Alesso et al. |
| 2012/0059547 A1 | 3/2012 | Chen et al. |
| 2012/0109483 A1 | 5/2012 | O'Dea et al. |
| 2012/0153718 A1 | 6/2012 | Rawlinson et al. |
| 2012/0181757 A1 | 7/2012 | Oteman et al. |
| 2012/0187640 A1 | 7/2012 | Kondo et al. |
| 2012/0193847 A1 | 8/2012 | Muragishi et al. |
| 2012/0305348 A1 | 12/2012 | Katayama et al. |
| 2012/0306170 A1 | 12/2012 | Serbu et al. |
| 2013/0060422 A1 | 3/2013 | Ogawa et al. |
| 2013/0060423 A1 | 3/2013 | Jolly |
| 2013/0106074 A1 | 5/2013 | Koku et al. |
| 2013/0221625 A1 | 8/2013 | Pare et al. |
| 2013/0229074 A1 | 9/2013 | Haferman et al. |
| 2013/0233632 A1 | 9/2013 | Kim et al. |
| 2013/0341143 A1 | 12/2013 | Brown |
| 2014/0145498 A1* | 5/2014 | Yamakado ............ B60W 30/02 303/3 |
| 2014/0260233 A1 | 9/2014 | Giovanardi et al. |
| 2014/0312580 A1 | 10/2014 | Gale |
| 2014/0358378 A1 | 12/2014 | Howard et al. |
| 2015/0123370 A1 | 5/2015 | Lee et al. |
| 2015/0197130 A1 | 7/2015 | Smith et al. |
| 2015/0224845 A1 | 8/2015 | Anderson et al. |
| 2015/0231942 A1 | 8/2015 | Trangbaek et al. |
| 2016/0059658 A1 | 3/2016 | Kuriki |
| 2016/0096458 A1 | 4/2016 | Parker et al. |
| 2016/0159187 A1 | 6/2016 | Mohamed |
| 2016/0167743 A1 | 6/2016 | Melcher |
| 2016/0291574 A1 | 10/2016 | Parison |
| 2016/0339823 A1 | 11/2016 | Smith et al. |
| 2017/0047823 A1 | 2/2017 | Sangermano, III et al. |
| 2017/0129367 A1 | 5/2017 | Hein |
| 2017/0129371 A1 | 5/2017 | Knox |
| 2017/0129372 A1 | 5/2017 | Hein et al. |
| 2017/0129373 A1 | 5/2017 | Knox et al. |
| 2017/0137023 A1 | 5/2017 | Anderson et al. |
| 2017/0203673 A1 | 7/2017 | Parker et al. |
| 2017/0253101 A1 | 9/2017 | Kuriki |
| 2017/0253155 A1 | 9/2017 | Knox et al. |
| 2018/0029585 A1* | 2/2018 | Tanimoto ............ B60W 30/12 |
| 2018/0089901 A1 | 3/2018 | Rober et al. |
| 2018/0105082 A1 | 4/2018 | Knox |
| 2018/0162186 A1 | 6/2018 | Anderson et al. |
| 2018/0162187 A1 | 6/2018 | Trangbaek |
| 2018/0297587 A1 | 10/2018 | Kasaiezadeh Mahabadi et al. |
| 2018/0345747 A1 | 12/2018 | Boon et al. |
| 2019/0248203 A1 | 8/2019 | Krehmer et al. |
| 2019/0308484 A1 | 10/2019 | Belter et al. |
| 2020/0088214 A1 | 3/2020 | Woodard et al. |
| 2020/0171907 A1 | 6/2020 | Hall et al. |

FOREIGN PATENT DOCUMENTS

| | | |
|---|---|---|
| DE | 102009060213 A1 | 6/2011 |
| DE | 202012002846 U1 | 7/2012 |
| DE | 102015003530 A1 | 9/2016 |
| DE | 102016000686 A1 | 7/2017 |
| DE | 102018208774 A1 | 12/2019 |
| EP | 2072855 A1 | 6/2009 |
| EP | 2233330 B1 | 2/2013 |
| EP | 3088230 A1 | 11/2016 |
| GB | 2437633 A | 10/2007 |
| JP | 2006200734 A | 8/2006 |
| JP | 2012002300 A | 1/2012 |
| JP | 2012167757 A | 9/2012 |
| JP | 2013244841 A | 12/2013 |
| JP | 5796315 B2 | 10/2015 |
| KR | 101509600 B1 | 4/2015 |
| WO | 9304883 A1 | 3/1993 |
| WO | 2012028228 A2 | 3/2012 |
| WO | 2014004118 A1 | 1/2014 |
| WO | 2014004119 A1 | 1/2014 |
| WO | 2014094934 A1 | 6/2014 |
| WO | 2015153811 A1 | 10/2015 |
| WO | 2015169530 A1 | 11/2015 |
| WO | 2016120044 A1 | 8/2016 |
| WO | 2017055151 A1 | 4/2017 |

OTHER PUBLICATIONS autoblog.com, "Porsche (finally) Unleashes Full, Official Details in 918 Spyder—Autoblog", Sep. 9, 2013, www.autoblog.com/2013/09/09/porsche-official-detials-918-spyder-frankfurt/ , Downloaded Mar. 13, 2017, 26 pp.

press.porsche.com, "Introducing the Porsche 918 Spyder", Date Unknown, http://press.porsche.com/news/release.php?id-787, Downloaded Mar. 13, 2017, 7 pp.

Edren, Johannes, "Motion Modelling and Control Strategies of Over-Actuated Vehicles", Doctoral Thesis, Stockholm 2014 (56 pp).

Monroe Intelligent Suspension, "CVSA2/KINETIC: Low Energy for High Performance", www.monroeintelligentsuspension.com/products/cvsa2-kinetic/, Date Unknown, Downloaded Mar. 2, 2017, 2 pp.

Tenneco, "Integrated Kinetic, H2 CES System, Ride Control Innovation, Accelerated", Rev. Sep. 2011, 4 pp.

Bolognesi, P., et al., "FEM Modeling and Analysis of a Novel Rotary-Linear Isotropic Brushless Machine", XIX International Conference of Electrical Machines—ICEM 2010, Rome (6 pp).

Xu, Lei, et. al., "Design and Analysis of a Double-Stator Linear-Rotary Permanent-Magnet Motor", IEEE Transactions on Applied Superconductivity, vol. 26, No. 4, Jun. 2016, (4 pp).

SAE International, "Michelin re-invents the wheel", Oct. 14, 2008, Downloaded Sep. 7, 2017, http://articles.sae.org/4604/ (2 pp).

daimler.com, "Suspension: The world's first suspension system with 'eyes'", https://media.daimler.com/marsMediaSite/en/instance/ko/Suspension-The-worlds-first-suspension-system-with-eyes.xhtml?oid=9904306, May 15, 2013 (6 pp).

youtube.com., KSSofficial, "Miniature Ball Screw With Ball Spline / English", Published on May 10, 2013, https://www.youtube.com/watch?v=vkcxmM0iC8U (2 pp).

Nippon Bearing, "Ball Screw Spline SPBR/SPBF", Product Description, Date Unknown, Downloaded Jun. 28, 2019, https://www.nbcorporation.com/shop/ball-spline/spbr-spbf/ (2 pp).

Wikipedia, "Trailing-arm suspension", https://en.wikipedia.org/wiki/Trailing-arm_suspension, downloaded Sep. 3, 2019 (2 pp).

Cosford, J., "Is it a fair fight? Hydraulics vs. electrics", https://www.mobilehydraulictips.com/fair-fight-hydraulics-vs-electrics/, Mar. 28, 2014 (10 pp).

* cited by examiner

VEHICLE WITH AUTOMATED SUBSYSTEMS

CROSS-REFERENCE TO RELATED APPLICATIONS

This application claims the benefit of U.S. Provisional Application No. 62/523,012, filed on Jun. 21, 2017, and entitled "Vehicle with Automated Subsystems," the content of which is incorporated herein by reference in its entirety for all purposes.

TECHNICAL FIELD

The application relates generally to automated subsystems for vehicles.

BACKGROUND

Road going vehicles have components that are responsible for controlling motion of the vehicle, such as steering components, propulsion components, and braking components. Vehicles can include controls that allow a human operator to direct motion of the vehicle. Vehicles can include automated systems that direct some or all aspects of motion of the vehicle.

SUMMARY

One aspect of the disclosed embodiments is a vehicle that includes a vehicle body and road wheels that are connected to the vehicle body. A propulsion system is operable to independently control propulsion torque to each of the road wheels. A steering system is operable to independently control a steering angle of each of the road wheels. A braking system is operable to independently control braking torque to each of the road wheels. An active suspension system regulates motion of the road wheels with respect to the vehicle body by independently controlling application of force to each of the road wheels. A vehicle control module is operable to determine a desired chassis-level motion, determine a control strategy to achieve the desired chassis-level motion, and output commands to each of the propulsion system, the steering system, the braking system, and the active suspension system to achieve the desired chassis-level motion.

In some implementations of the vehicle, the commands to the propulsion system from the vehicle control module include independent propulsion commands corresponding to each of the road wheels, the commands to the steering system from the vehicle control module include independent steering commands corresponding to each of the road wheels, the commands to the braking system from the vehicle control module include independent braking commands corresponding to each of the road wheels, and the commands to the active suspension system from the vehicle control module include independent active suspension commands corresponding to each of the road wheels.

In some implementations of the vehicle, the commands to each of the propulsion system, the steering system, the braking system, and the active suspension system describe a respective allocated portion of the desired chassis-level motion. The propulsion system may include a propulsion controller that is operable to determine independent propulsion commands corresponding to each of the road wheels based on the respective allocated portion of the desired chassis-level motion for the propulsion system. The steering system may include a steering controller that is operable to determine independent steering commands corresponding to each of the road wheels based on the respective allocated portion of the desired chassis-level motion for the steering system. The braking system may include a braking controller that is operable to determine independent braking commands corresponding to each of the road wheels based on the respective allocated portion of the desired chassis-level motion for the braking system. The active suspension system may include a suspension controller that is operable to determine independent active suspension commands corresponding to each of the road wheels based on the respective allocated portion of the desired chassis-level motion for the active suspension system.

In some implementations of the vehicle, the vehicle control module is operable to receive information describing operating characteristics for each of the propulsion system, the steering system, the braking system, and the active suspension system. The vehicle control module may, based on information received from at least one of the propulsion system, the steering system, the braking system, or the active suspension system, modify operation of another of the propulsion system, the steering system, the braking system, or the active suspension system.

In some implementations of the vehicle, the vehicle control module is operable to modify operation of at least one of the propulsion system, the steering system, the braking system, or the active suspension system based on a request received from another of the propulsion system, the steering system, the braking system, or the active suspension system.

In some implementations of the vehicle, the vehicle control module determines the desired chassis-level motion based on a desired trajectory for the vehicle.

In some implementations of the vehicle, the desired chassis-level motion includes at least one of a speed, an acceleration, a yaw rate, a pitch rate, a roll rate, a yaw moment, a pitch moment, and a roll moment.

Another aspect of the disclosed embodiments is a vehicle that includes a vehicle body and road wheels that are connected to the vehicle body. A propulsion system is operable to independently control propulsion torque to each of the road wheels. A steering system is operable to independently control a steering angle of each of the road wheels. A braking system is operable to independently control braking torque to each of the road wheels. An active suspension system regulates motion of the road wheels with respect to the vehicle body by independently controlling application of force to each of the road wheels. A vehicle control module is operable to determine a desired chassis-level motion, allocate a first portion of the desired chassis-level motion to one of the propulsion system, the steering system, the braking system, or the active suspension system, allocate a second portion of the desired chassis-level motion to another one of the propulsion system, the steering system, the braking system, or the active suspension system, and output commands to cause operation in accordance with the desired chassis-level motion.

In some implementations of the vehicle, the first portion of the desired chassis-level motion and the second portion of the desired chassis-level motion are allocated using a cost function. The cost function may be based in part on energy efficiency. The cost function may be based in part on comfort. The cost function may be based in part on controllability.

Another aspect of the disclosed embodiments is a vehicle that includes a vehicle body and road wheels that are connected to the vehicle body. A propulsion system is operable to independently control propulsion torque to each of the road wheels. A steering system is operable to independently control a steering angle of each of the road wheels. A braking system is operable to independently control braking torque to each of the road wheels. An active suspension system regulates motion of the road wheels with respect to the vehicle body by independently controlling application of force to each of the road wheels. A vehicle control module is operable to determine a desired chassis-level motion, determine a first control strategy to achieve the desired chassis-level motion, determine a second control strategy to achieve the desired chassis-level motion, and select one of the first control strategy or the second control strategy for controlling operation of one or more of the propulsion system, the steering system, the braking system, or the active suspension system.

In some implementations of the vehicle, the vehicle control module is operable to select one of the first control strategy or the second control strategy using a cost function based on one or more criteria associated with the first control strategy and the second control strategy. The one or more criteria may include at least one of energy efficiency, comfort, or controllability.

DETAILED DESCRIPTION

The disclosure herein relates to vehicles that have multiple automated subsystems that allow for high levels of maneuverability, controllability, and comfort.

Figure 1:
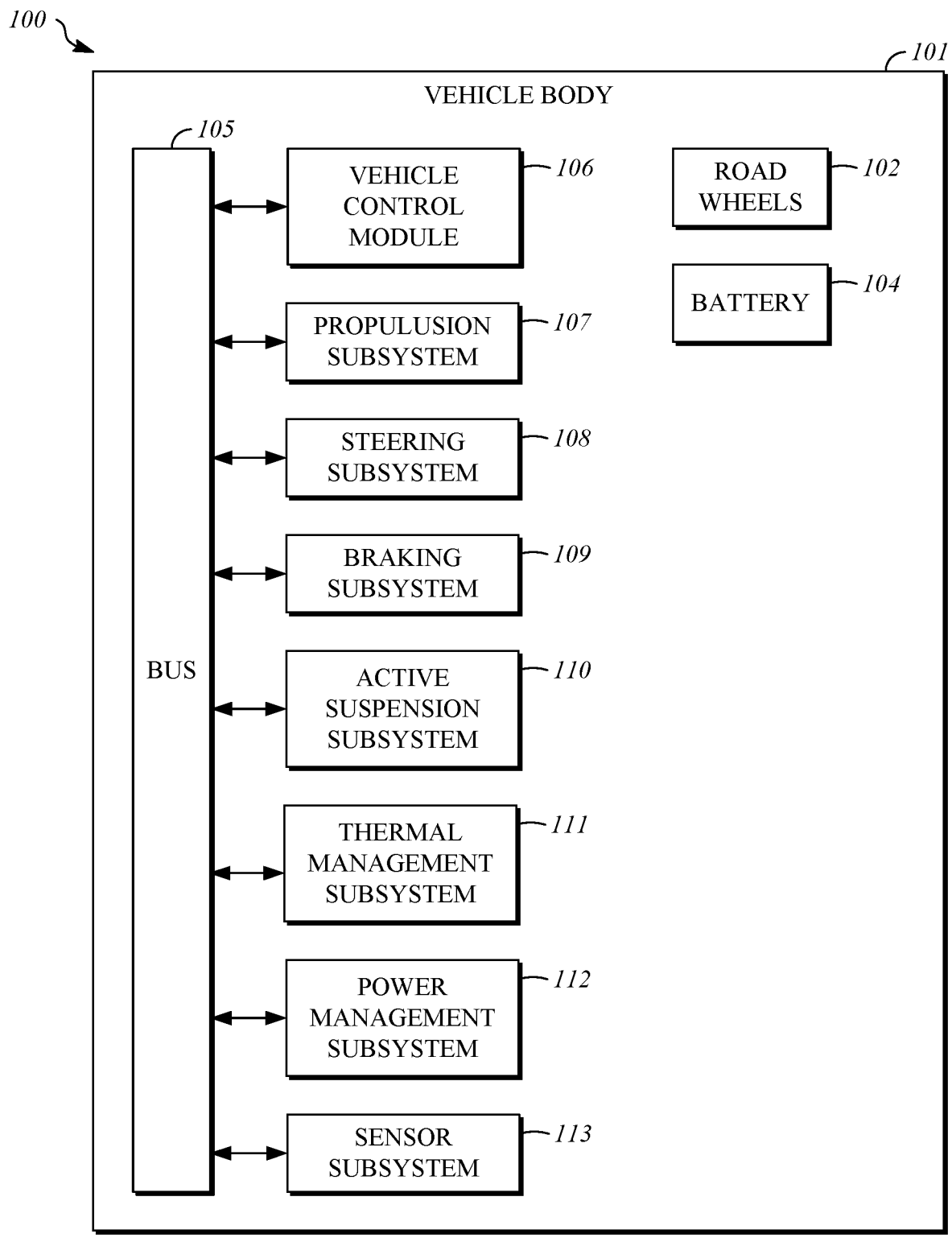
FIG. 1 is an illustration that shows a vehicle.

FIG. 1 is an illustration that shows a vehicle 100. The vehicle 100 is a wheeled vehicle that is intended for on-road use, to transport human passengers and/or cargo. The vehicle 100 has a vehicle body 101, road wheels 102, a battery 104, a communications bus 105, a vehicle control module 106, a propulsion subsystem 107, a steering subsystem 108, a braking subsystem 109, an active suspension subsystem 110, a thermal management subsystem 111, a power management subsystem 112, and a sensor subsystem 113.

The vehicle body 101 serves as the primary structure of the vehicle 100 and physically interconnects the various components of the vehicle 100. The vehicle body 101 may include internal structural portions and external portions that are aesthetic and/or structural in nature. As examples, the vehicle body 101 may include one or more of a unibody, a frame, a subframe, a monocoque, and body panels.

The road wheels 102 are the portions of the vehicle 100 that contact the surface on which the vehicle 100 is travelling. The characteristics of the road wheels 102 are responsible, in part, for an amount of friction available to the vehicle 100 relative to the surface on which it is travelling. The road wheels 102 can each be an assembly that includes a wheel rim and a tire, such as a conventional pneumatic tire that is formed in part from synthetic rubber. Other friction-enhancing structures may be incorporated in the road wheels 102. The vehicle 100 can include four of the road wheels 102, or can include a different number of the road wheels 102.

The battery 104 is an electrical storage device that provides electrical power to the systems and subsystems of the of the vehicle 100. The electrical power provided by the battery 104 can be utilized to power actuator systems, control systems, and passenger comfort and convenience systems. The battery 104 is rechargeable, and can be repeatedly charged and discharged to supply power to the systems and subsystems of the vehicle 100, as will be described with respect to the power management subsystem 112.

The communications bus 105 is a system that allows the systems, subsystems, and components of the vehicle 100 to send and receive communications, such as commands and requests. The communications bus 105 allows communication between the vehicle control module 106, the propulsion subsystem 107, the steering subsystem 108, the braking subsystem 109, the active suspension subsystem 110, the thermal management subsystem 111, the power management subsystem 112, and the sensor subsystem 113, which are all are electrically connected to the communications bus 105. The communications sent and received using the communications bus 105 can be in the form of signals and/or data. As an example, the communications bus 105 can be configured in accordance with the Controller Area Network (CAN bus) standard, which allows connected devices to communicate with other connected devices using a message-based communications protocol.

The vehicle control module 106 is an electronic control unit. The vehicle control module 106 is a computing device that receives information from the vehicle subsystems, makes coordinated decisions regarding operation of the vehicle subsystems, and transmits commands to the vehicle subsystems. The vehicle control module 106 can include a memory and a processor that is operable to execute instructions that are stored in the memory. When executed, the instructions cause the processor to perform vehicle control operations, including making specific decisions and outputting specific commands to the vehicle subsystems, as will be described herein. Although the vehicle control module 106 is shown as a single device, the same functions can be implemented using multiple devices. For example, multiple electronic control units can be provided to perform functions described herein with respect to the vehicle control module 106.

The vehicle control module 106 controls and coordinates the efforts of multiple vehicle systems and subsystems. As will be explained herein, for example, the vehicle control module 106 controls an actuator system that includes the propulsion subsystem 107, the steering subsystem 108, the braking subsystem 109, and the active suspension subsystem 110.

The vehicle control module 106 can allow operation of the vehicle 100 in an automated driving mode. In the automated driving mode, the vehicle control module 106 has primary control over motion of the vehicle 100. The vehicle 100 can also be operated in a manual control mode, in which a human driver has primary control over motion of the vehicle 100. The vehicle 100 can also be operated in a semi-automated control mode, in which the human driver maintains control of the vehicle 100, but with some control functions performed by the vehicle control module 106, such as lane-following or emergency braking.

In the automated driving mode, the vehicle 100 utilizes automated control functions that are incorporated in the vehicle control module 106 to direct operation of the vehicle subsystems. The automated control functions use information provided by the sensor subsystem 113 as inputs. The automated control functions can also use other information as inputs. Stored information can be utilized by the automated control functions. Stored information can include, as examples, mapping information or information recorded during a previous trip on the same roadway that is currently being traveled upon. The automated control functions can also receive and utilize information from external data sources. One example of an external data source includes information received from other vehicles that are located in the vicinity of the vehicle 100. Outputs of the automated control functions are transmitted to the vehicle subsystems from the vehicle control module 106 in the form of commands. The automated control functions can also modify operation of the vehicle subsystems in response to information received from the vehicle subsystems or in response to requests that are made by the vehicle subsystems.

The automated control functions of the vehicle control module 106 can determine a desired chassis-level motion for the vehicle 100. The chassis-level motion can be determined by the automated control functions based on a desired trajectory for the vehicle 100 and/or a desired velocity profile for the vehicle 100. The desired chassis-level motion for the vehicle 100 can include desired states. The desired states can include, as examples, speed, acceleration, yaw rate, pitch rate, roll rate, yaw moment, pitch moment, and roll moment. The desired states can be determined by the automated control functions of the vehicle control module 106, for example, to cause the vehicle 100 to follow the desired trajectory and a desired velocity profile. Using the desired chassis-level motion, the automated control functions of the vehicle control module 106 can determine a control strategy that achieves the desired chassis-level motion using the vehicle subsystems.

The thermal management subsystem 111 is responsible for regulating the temperature of various components of the vehicle 100, and for providing a comfortable environment within the passenger compartment of the vehicle 100. The power management subsystem 112 regulates operation and usage of the battery 104, including usage of electrical power from the battery 104 and charging of the battery 104. The sensor subsystem 113 includes various sensor components that output signals representing environmental conditions outside the vehicle 100 and operating states of the vehicle 100, including operating states of the vehicle subsystems.

Figure 2:
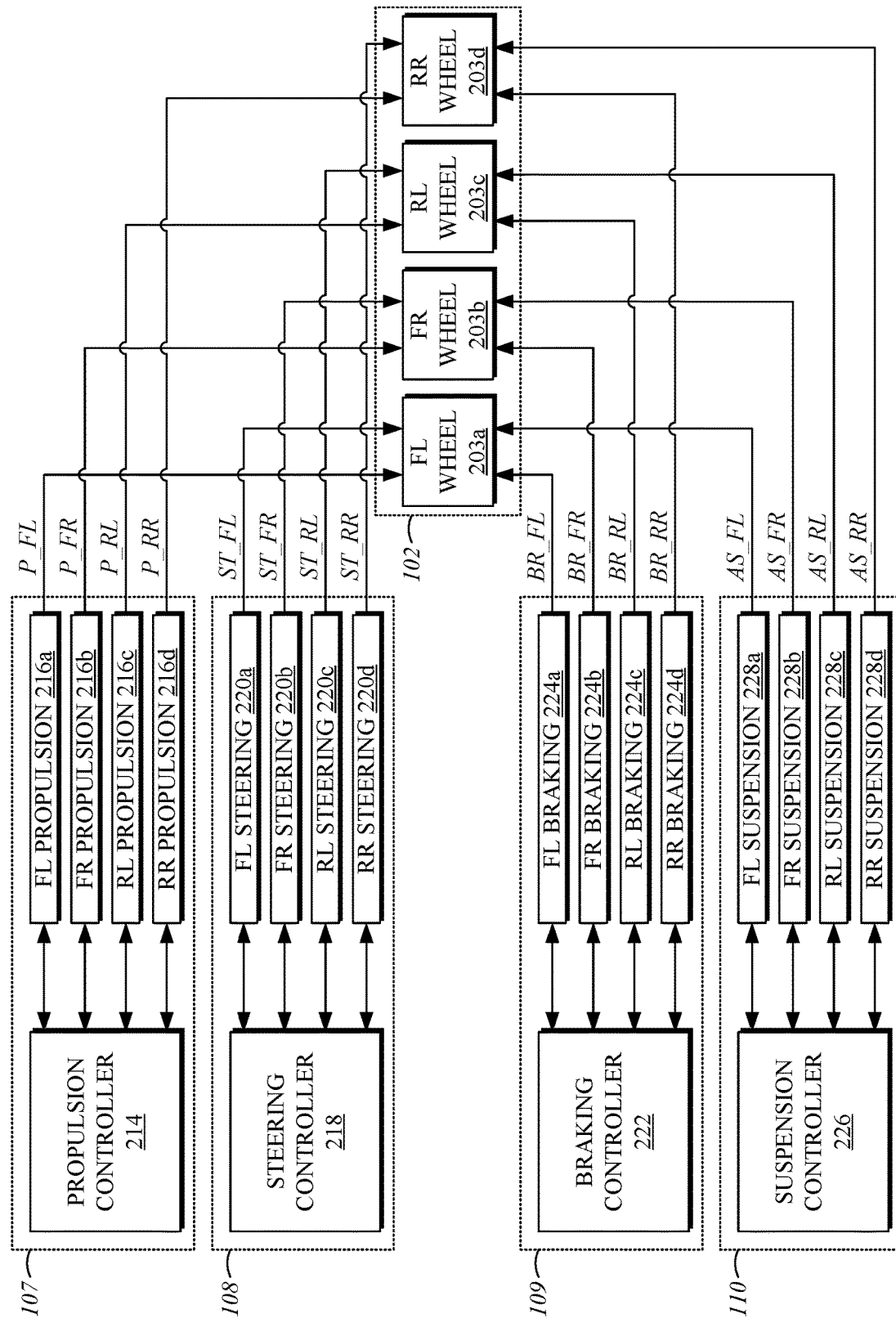
FIG. 2 is an illustration that shows actuator subsystems of the vehicle.

FIG. 2 is an illustration that shows the actuator subsystems of the vehicle 100, including relationships between the actuator subsystems and the road wheels 102. The actuator subsystems, including the propulsion subsystem 107, the steering subsystem 108, the braking subsystem 109, and the active suspension subsystem 110, are configured to exercise independent control over each of the road wheels 102. In the illustrated implementation, the road wheels 102 include a front left wheel 203a, a front right wheel 203b, a rear left wheel 203c, and a rear right wheel 203d.

The propulsion subsystem 107 includes a propulsion controller 214. The propulsion controller 214 is a computing device that communicates with the vehicle control module 106. As one example, the propulsion controller 214 receives commands from the vehicle control module 106. As another example, the propulsion controller 214 sends requests to the vehicle control module 106. As another example, the propulsion controller 214 sends information to the vehicle control module 106, such as information describing operating states of components of the propulsion subsystem 107 and information obtained from sensors incorporated in the propulsion subsystem 107.

In implementations of the vehicle 100 that include both automated and manual control modes, the propulsion subsystem 107 can be controlled by the vehicle control module 106 in the automated control mode and by an input device, such as a pedal, in the manual control mode.

The propulsion subsystem 107 is operable to cause motion of the vehicle 100 by applying propulsion torque at the road wheels 102. The propulsion subsystem 107 includes propulsion actuators (e.g., electric motors or assemblies that include electric motors) that are operable to cause motion of the vehicle 100 by providing propulsion torque. Propulsion torques can be applied individually to each of the road wheels 102 to accelerate or decelerate each of the road wheels 102. Independently controlling application of propulsion torques to the road wheels allows, for example, torque vectoring control, in which a yaw moment is applied to the vehicle 100 by differential application of propulsion torque at the left and right sides of the vehicle 100. The propulsion subsystem 107 includes a front left propulsion actuator assembly 216a, a front right propulsion actuator assembly 216b, a rear left propulsion actuator assembly 216c, and a rear right propulsion actuator assembly 216d.

The propulsion actuators assemblies are each able to provide an independent propulsion torque to one of the road wheels 102 of the vehicle 100. The front left propulsion actuator assembly 216a provides a propulsion torque P_FL to the front left wheel 203a. The front right propulsion actuator assembly 216b provides a propulsion torque P_FR to the front right wheel 203b. The rear left propulsion actuator assembly 216c provides a propulsion torque P_RL to the rear left wheel 203c, and the rear right propulsion actuator assembly 216d provides a propulsion torque P_RR to the rear right wheel 203d.

The steering subsystem 108 is operated by a steering controller 218. The steering controller 218 is a computing device that communicates with the vehicle control module 106. As one example, the steering controller 218 receives commands from the vehicle control module 106. As another example, the steering controller 218 sends requests to the vehicle control module 106. As another example, the steering controller 218 sends information to the vehicle control module 106, such as information describing operating states of components of the steering subsystem 108 and information obtained from sensors that are incorporated in the steering subsystem 108.

In implementations of the vehicle 100 that include both automated and manual control modes, the steering subsystem 108 can be controlled by the vehicle control module 106 in the automated control mode and by an input device, such as a steering wheel, in the manual control mode. As an example, a steering wheel can be included in the vehicle 100 in a steer-by-wire configuration in which an encoder associated with the steering wheel transmits a steering wheel angle signal to the steering controller 218. A mechanical backup can be provided to mechanically connect the steering wheel to the road wheels 102 if steer-by-wire control is not available.

The steering subsystem 108 is operable to steer the vehicle 100 to change the direction of travel of the vehicle 100 and/or to apply a yaw moment to the vehicle 100. Steering can be applied individually to each of the road wheels 102. The steering subsystem 108 includes steering actuators that are each connected to one of the road wheels 102 of the vehicle 100. The steering subsystem 108 includes a front left steering actuator assembly 220a, a front right steering actuator assembly 220b, a rear left steering actuator assembly 220c, and a rear right steering actuator assembly 220d.

The steering actuator assemblies (e.g., electric motor driven steering linkages) control the steering angles of the road wheels 102 independently. The front left steering actuator assembly 220a controls a front left steering angle ST_FL of the front left wheel 203a. The front right steering actuator assembly 220b controls a front right steering angle ST_FR of the front right wheel 203b. The rear left steering actuator assembly 220c controls a rear left steering angle ST_RL of the rear left wheel 203c. The rear right steering actuator assembly 220d controls a rear right steering angle ST_RR of the rear right wheel 203d.

The front left steering actuator assembly 220a, the front right steering actuator assembly 220b, the rear left steering actuator assembly 220c, and the rear right steering actuator assembly 220d are all capable of steering respective ones of the road wheels 102 to respective maximum steering angles. In one implementation, for example, the maximum steering angles for each of the front left steering actuator assembly 220a, the front right steering actuator assembly 220b, the rear left steering actuator assembly 220c, and the rear right steering actuator assembly 220d are at least fifteen degrees left or right relative a straight-ahead orientation. Independent steering angle control allows for multiple steering control strategies. As an example, the rear left wheel 203c and the rear right wheel 203d can be steered opposite the direction of the front left wheel 203a and the front right wheel 203b to enhance maneuverability at lower speeds. As another example, the rear left wheel 203c and the rear right wheel 203d, can be steered in the same direction as the front left wheel 203a and the front right wheel 203b for smooth lane changes at higher speeds.

The braking subsystem 109 is operated by a braking controller 222. The braking controller 222 is a computing device that communicates with the vehicle control module 106. As one example, the braking controller 222 receives commands from the vehicle control module 106. As another example, the braking controller 222 sends requests to the vehicle control module 106. As another example, the braking controller 222 sends information to the vehicle control module 106, such as information describing operating states of components of the braking subsystem 109 and information obtained from sensors incorporated in the braking subsystem 109.

In implementations of the vehicle 100 that include both automated and manual control modes, the braking subsystem 109 can be controlled by the vehicle control module 106 in the automated control mode and by an input device, such as a pedal, in the manual control mode.

The braking subsystem 109 functions to decelerate the vehicle 100 by independently decelerating the road wheels 102. Independent braking can also be used to reduce the propulsion torque applied to individual ones of the road wheels 102 to provide differing propulsion torques for each of the road wheels 102 as a part of torque vectoring control.

The braking subsystem 109 includes braking actuators (e.g., friction brakes) that are operable to slow the vehicle 100 or induce yaw by applying a braking torque at one or more of the road wheels 102. The braking subsystem 109 includes a front left braking actuator assembly 224a, a front right braking actuator assembly 224b, a rear left braking actuator assembly 224c, and a rear right braking actuator assembly 224d.

The braking actuator assemblies are each able to provide an independent braking torque to one of the road wheels 102 of the vehicle 100. The front left braking actuator assembly 224a provides a braking torque BR_FL to the front left wheel 203a. The front right braking actuator assembly 224b provides a braking torque BR_FR to the front right wheel 203b. The rear left braking actuator assembly 224c provides a braking torque BR_RL to the rear left wheel 203c. The rear right braking actuator assembly 224d provides a braking torque BR_RR to the rear right wheel 203d.

The active suspension subsystem 110 controls the vertical motion of the road wheels 102 relative to the vehicle body 101. In a purely passive suspension, the vertical motion of the wheels is dictated by external forces that act on the road wheels 102 in combination with passive suspension characteristics. In contrast, the active suspension subsystem 110 applies forces to control vertical motion of the road wheels 102. As one example, the active suspension subsystem 110 can apply forces to the road wheels 102 in response to the external forces that act on the road wheels 102. As one example, the active suspension subsystem 110 can apply forces to the road wheels 102 based on desired operating characteristics, as determined by the vehicle control module 106. As another example, the active suspension subsystem 110 can apply forces to the road wheels 102 in response to predictions made by the vehicle control module 106 based on external conditions. For instance, the vehicle control module 106 can identify the presence of uneven pavement on the roadway ahead of the vehicle 100 using information received from the sensor subsystem 113, and modify operation of the active suspension subsystem 110 in response to identification of the uneven pavement in order to minimize vibrations resulting from travelling on the uneven pavement.

The active suspension subsystem 110 is operated by a suspension controller 226. The suspension controller 226 is a computing device that communicates with the vehicle control module 106. As one example, the suspension controller 226 receives commands from the vehicle control module 106. As another example, the suspension controller 226 sends requests to the vehicle control module 106. As another example, the suspension controller 226 sends information to the vehicle control module 106, such as information describing operating states of components of the active suspension subsystem 110 and information obtained from sensors incorporated in the active suspension subsystem 110.

The active suspension subsystem 110 includes suspension actuators (e.g., mechanical suspension actuators, pneumatic suspension actuators, and/or hydraulic suspension actuators) that are operable to apply forces to the suspension of the vehicle 100. Forces can be applied to the road wheels 102 individually. For example, the active suspension subsystem 110 can apply a force to counter an external force that is applied to one of the road wheels 102, for example, as a result of contact with an irregular feature in a roadway surface. The active suspension subsystem 110 includes a front left suspension actuator assembly 228a, a front right suspension actuator assembly 228b, a rear left suspension actuator assembly 228c, and a rear right suspension actuator assembly 228d.

The suspension actuator assemblies are each able to provide an independent active suspension force from the vehicle body 101 to one of the road wheels 102 of the vehicle 100. As an example, the active suspension force can be applied in an upward direction or in a downward direction. The front left suspension actuator assembly 228a provides an active suspension force AS_FL to the front left wheel 203a. The front right suspension actuator assembly 228b provides an active suspension force AS_FR to the front right wheel 203b. The rear left suspension actuator assembly 228c provides an active suspension force AS_RL to the rear left wheel 203c. The rear right suspension actuator assembly 228d provides an active suspension force AS_RR to the rear right wheel 203d.

Figure 3:
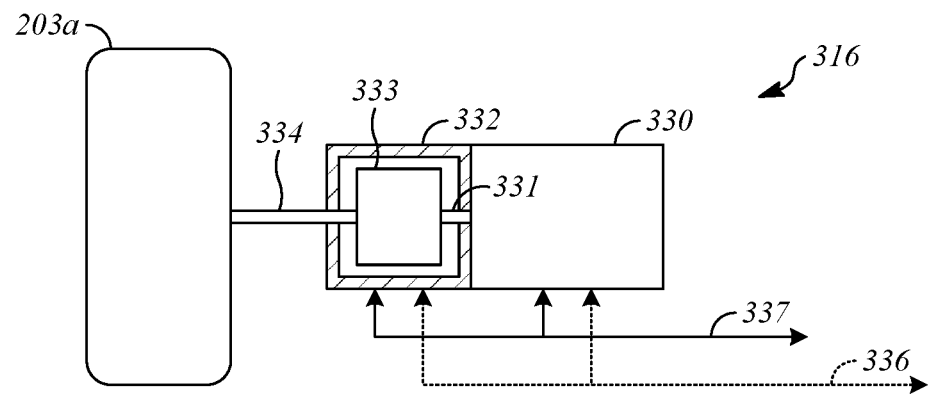
FIG. 3 is an illustration that shows a propulsion actuator assembly according to a first example.

FIG. 3 is an illustration showing a propulsion actuator assembly 316 according to a first example. The propulsion actuator assembly 316 includes a motor 330, a motor output 331, a gearbox 332, a gear train 333, a gearbox output 334, an electrical connection 336, and a thermal connection 337.

The propulsion actuator assembly 316 can be utilized in the propulsion subsystem 107, for example, as the front left propulsion actuator assembly 216a (FIG. 2), and is shown connected to the front left wheel 203a. The propulsion actuator assembly 316 can also be used as the front right propulsion actuator assembly 216b, the rear left propulsion actuator assembly 216c, or the rear right propulsion actuator assembly 216d of the propulsion subsystem 107.

The motor 330 can be, as examples, a brushed direct current electric motor, a brushless direct current electric motor, or an alternating current induction motor. The motor output 331 can be a rotating shaft.

Operation of the motor 330 can be controlled by the propulsion controller 214 (FIG. 2) or by other control systems. The propulsion controller 214 can transmit a command to the motor 330 using the electrical connection 336 to cause operation of the motor 330 in a manner that achieves a desired operating parameter or operating state. As an example, the propulsion controller 214 can cause operation of the motor 330 to achieve a desired rotation rate for the motor output 331, or to achieve a desired propulsion torque.

The gearbox 332 includes a gear train 333 that is connected to the motor output 331 of the motor 330 and receives a rotating input force from the motor output 331 of the motor 330. The gear train 333 applies a gear ratio to the rotating input force received at the motor output 331 such that the gearbox output 334 rotates in response to rotation of the motor output 331, but at a different rate of rotation than the rate of rotation of the motor output 331. The gear train 333 can be of a type that has a fixed gear ratio, or the gear train 333 can be of a type that allows the gear ratio to be changed. The mechanical configuration of the gear train 333 can be equivalent to that of, as examples, an automatic transmission, an automated manual transmission, or a continuously variable transmission. In some implementations, the gearbox 332 can be connected to the electrical connection 336 to receive commands from the propulsion controller 214 (FIG. 2) or from other control systems. The gearbox output 334 can be a shaft or other mechanical component that is connected to a wheel, such as the front left wheel 203a, either by a direct connection or by an indirect connection through other components.

The thermal connection 337 can be a fluid line that is connected to the motor 330 and/or the gearbox 332. The thermal connection 337 is connected to the thermal management subsystem 111 (FIG. 1), which supplies a heated or chilled media to the motor 330 and/or the gearbox 332 to maintain desired operating temperature ranges.

Figure 4:
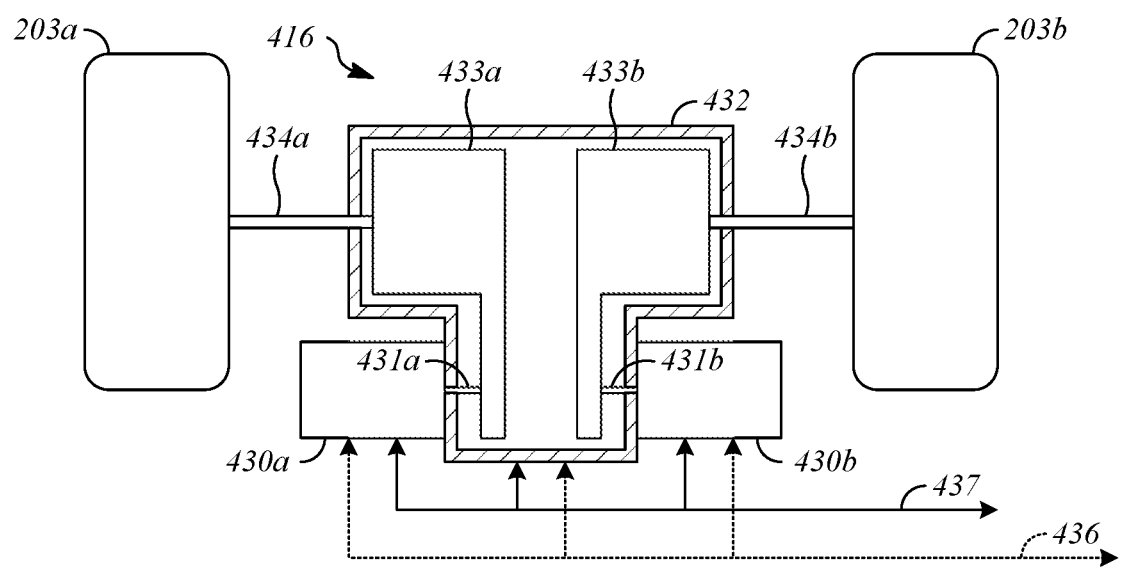
FIG. 4 is an illustration that shows a propulsion actuator assembly according to a second example.

FIG. 4 is an illustration showing a propulsion actuator assembly 416 according to a second example. The propulsion actuator assembly 416 includes a left motor 430a that has a left motor output 431a and a right motor 430b that has a right motor output 431b. The propulsion actuator assembly 416 also includes a gearbox 432 that houses a left gear train 433a that is connected to a left gearbox output 434a and a right gear train 433b that is connected to a right gearbox output 434b. The propulsion actuator assembly 416 also includes an electrical connection 436 and a thermal connection 437.

The propulsion actuator assembly 416 can be utilized in the propulsion subsystem 107, for example, in place of the front left propulsion actuator assembly 216a and the front right propulsion actuator assembly 216b (FIG. 2), and is shown connected to the front left wheel 203a and the front right wheel 203b. The propulsion actuator assembly 416 can also be used in place of the rear left propulsion actuator assembly 216c and the rear right propulsion actuator assembly 216d of the propulsion subsystem 107.

The left motor 430a and the right motor 430b can each be, as examples, a brushed direct current electric motor, a brushless direct current electric motor, or an alternating current induction motor. The left motor output 431a and the right motor output 431b can each be a rotating shaft.

Operation of the left motor 430a and the right motor 430b can be controlled by the propulsion controller 214 (FIG. 2). The propulsion controller 214 can transmit commands to each of the left motor 430a and the right motor 430b using the electrical connection 436. The commands sent to the left motor 430a and the right motor 430b are independent in nature. Each of the left motor 430a and the right motor 430b, in response to the commands, operate in a manner that corresponds to a desired operating parameter or operating state. As an example, the propulsion controller 214 can cause operation of the left motor 430a to achieve a desired rotation rate having a first value, and can simultaneously cause operation of the right motor 430b to achieve a desired rotation rate having a second value.

The gearbox 432 houses the left gear train 433a and the right gear train 433b. The left gear train 433a and the right gear train 433b operate independently of one another. As an example, the gearbox 432 can be free from components that transfer torque between the left gear train 433a and the right gear train 433b.

The left gear train 433a is connected to the left motor output 431a of the left motor 430a and receives a rotating input force from the left motor 430a. The right gear train 433*b* is connected to the right motor output 431*b* of the right motor 430*b* and receives a rotating input force from the right motor 430*b*.

The left gear train 433*a* and the right gear train 433*b* each apply a gear ratio to the rotating input forces received at the left motor output 431*a* and the right motor output 431*b* such that the left gearbox output 434*a* and the right gearbox output 434*b* each in response to the input rotations, but at different rates than the left motor output 431*a* and the right motor output 431*b*. The left gear train 433*a* and the right gear train 433*b* can each be of a type that provides a fixed gear ratio or of a type that allows the gear ratio to be changed. The mechanical configurations of the left gear train 433*a* and the right gear train 433*b* can each be equivalent to that of, as examples, an automatic transmission, an automated manual transmission, or a continuously variable transmission. The left gearbox output 434*a* and the right gearbox output 434*b* can each be a shaft or other mechanical component that is connected to a wheel, such as the front left wheel 203*a* and the front right wheel 203*b*, either by a direct connection or by an indirect connection through other components.

The thermal connection 437 can be a fluid line that is connected to the left motor 430*a*, the right motor 430*b*, and/or the gearbox 432. The thermal connection 437 is connected to the thermal management subsystem 111 (FIG. 1), which supplies a heated or chilled media to the left motor 430*a*, the right motor 430*b*, and/or the gearbox 432 to maintain desired operating temperature ranges. Because the gearbox 432 contains the left gear train 433*a* and the right gear train 433*b*, both can be heated or cooled by supply of the heated or chilled media to the gearbox 432.

Figure 5:
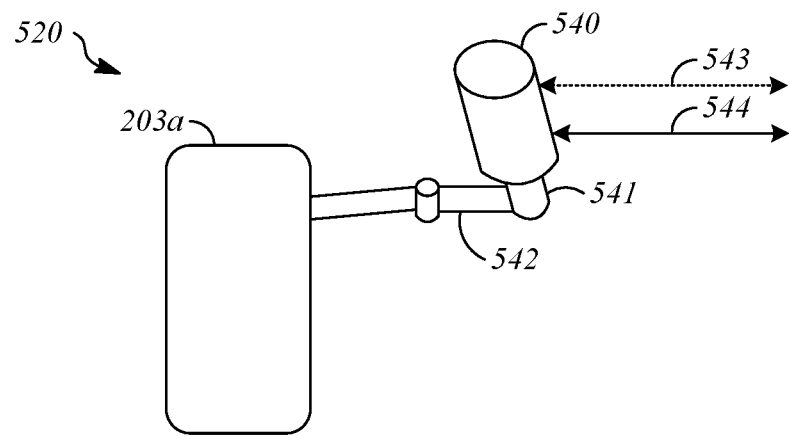
FIG. 5 is an illustration that shows a steering actuator assembly.

FIG. 5 is an illustration showing a steering actuator assembly 520 according to an example. The steering actuator assembly 520 includes a steering motor 540, an output part 541, a steering linkage 542, an electrical connection 543, and a thermal connection 544.

The steering actuator assembly 520 can be utilized in the steering subsystem 108, for example as the left steering actuator assembly 220*a* (FIG. 2), and is shown connected to the front left wheel 203*a*. The steering actuator assembly 520 can also be used as the front right steering actuator assembly 220*b*, the rear left steering actuator assembly 220*c*, or the rear right steering actuator assembly 220*d* of the steering subsystem 108.

The steering motor 540 is an electric motor that is controlled by the steering controller 218 (FIG. 2). The steering motor 540 is operable to rotate the output part 541. Rotation of the output part 541 causes a corresponding rotation of at least a portion of the steering linkage 542. The steering linkage 542 is configured to cause pivoting of the front left wheel 203*a* around an axis that is substantially upright relative to the vehicle body 101, and can be implemented according to numerous known configurations. Accordingly, rotation of the steering linkage 542 by the output part 541 changes the steering angle of the front left wheel 203*a*.

The steering controller 218 can transmit a command to the steering actuator assembly 520 using the electrical connection 543. As one example, the command sent by the steering controller 218 can specify a direction of rotation for the steering motor 540. As another example, the command sent by the steering controller 218 can cause the steering motor 540 to rotate the output part 541 such that a desired steering angle is obtained for the front left wheel 203*a*. As one example, the steering motor 540 can incorporate a position encoder that outputs a feedback signal that is usable to control the steering angle obtained by rotation of the steering motor 540.

The thermal connection 544 can be a fluid line that is connected to the steering motor 540. The thermal connection 544 is connected to the thermal management subsystem 111 (FIG. 1), which supplies a heated or chilled media to the steering motor 540 to maintain desired operating temperature ranges.

In the illustrated example, the steering actuator assembly 520 controls the steering angle of a single one of the road wheels 102, such as the front left wheel 203*a* in the illustrated example. It should be understood that two set of the components described with respect to the steering actuator assembly 520 could be incorporated in a single housing from which a pair of the road wheels 102 (e.g., the front left wheel 203*a* and the front right wheel 203*b* or the rear left wheel 203*c* and the rear right wheel 203*d*) are independently controlled.

Figure 6:
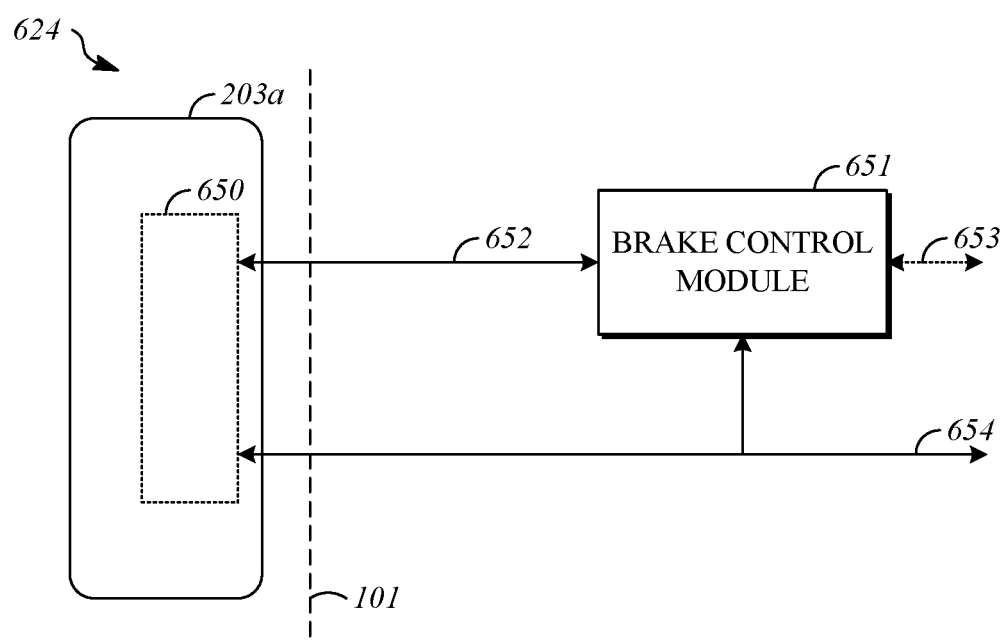
FIG. 6 is an illustration that shows a braking actuator assembly according to a first example.

FIG. 6 is an illustration showing a braking actuator assembly 624 according to a first example. The braking actuator assembly 624 is a friction braking system. The braking actuator assembly 624 includes a braking actuator 650, a brake control module 651, a control connection 652, an electrical connection 653, and a thermal connection 654.

The braking actuator assembly 624 can be utilized in the braking subsystem 109, for example as the front left braking actuator assembly 224*a* (FIG. 2), and is shown connected to the front left wheel 203*a*. The braking actuator assembly 624 can also be used as the front right braking actuator assembly 224*b*, the rear left braking actuator assembly 224*c*, or the rear right braking actuator assembly 224*d* of the braking subsystem 109.

The braking actuator 650 is connected to the front left wheel 203*a*, and is part of the unsprung mass of the vehicle 100. The braking actuator 650 includes rotating components that rotate in unison with the front left wheel 203*a*, and non-rotating components that are located at the front left wheel 203*a* outboard from the vehicle body 101, but do not rotate in unison with the front left wheel 203*a*.

The non-rotating components of the braking actuator 650 interact with rotating components that are connected to the front left wheel 203*a* in order applying braking torque to the front left wheel 203*a* independent of braking applied to any other wheel of the vehicle 100. Application of braking torque to the front left wheel 203*a* can cause deceleration of the front left wheel 203*a*, or can reduce acceleration applied to the front left wheel 203*a* by the propulsion subsystem 107, as will be explained further herein. The non-rotating components are indirectly connected to the vehicle body 101 by suspension components or other structures.

The braking actuator 650 can be a friction braking device. One type of friction braking device that can be used as the braking actuator 650 is a disc brake in which hydraulic pistons cause engagement of friction pads with a rotor. The rotor is connected to the front left wheel 203*a* such that it rotates in unison with the front left wheel 203*a*. Another type of friction braking device is a drum brake in which brake shoes are urged outward by a hydraulic actuator into engagement with interior surfaces of a cylindrical brake drum that rotates in unison with the front left wheel 203*a*. Another type of friction brake is an electronic friction brake in which a non-rotating friction member is urged into engagement with a rotating part by a braking force provided by an electromagnet. As another example, the braking actuator 650 can be or include an electrical generator, as part of a regenerative braking system.

The braking actuator 650 can be directly controlled by the brake control module 651. The brake control module 651 can exercise real-time control over the braking actuator 650 using feedback from sensors, such as wheel speed sensors, which may be incorporated in the braking actuator 650. The brake control module 651 is connected to and receives commands from the braking controller 222 by the electrical connection 653. The brake control module 651 controls operation of the braking actuator 650 using the control connection 652 in response to the commands received from the braking controller 222 and optionally based on feedback received from sensors that monitor operation of the braking actuator 650. In implementations where the braking actuator 650 is a hydraulically-operated actuator, the brake control module 651 can include a hydraulic control system, and the control connection 652 can be a hydraulic fluid line that is used by the brake control module 651 to modulate hydraulic pressure supplied to the braking actuator 650. In implementations where the braking actuator 650 is an electrically-operated actuator, the control connection 652 can be an electrical connection.

The thermal connection 654 can be a fluid line that is connected to the braking actuator 650 and/or the brake control module 651. The thermal connection 654 is connected to the thermal management subsystem 111 (FIG. 1), which supplies a heated or chilled media to the braking actuator 650 and/or the brake control module 651 to maintain desired operating temperature ranges.

Figure 7:
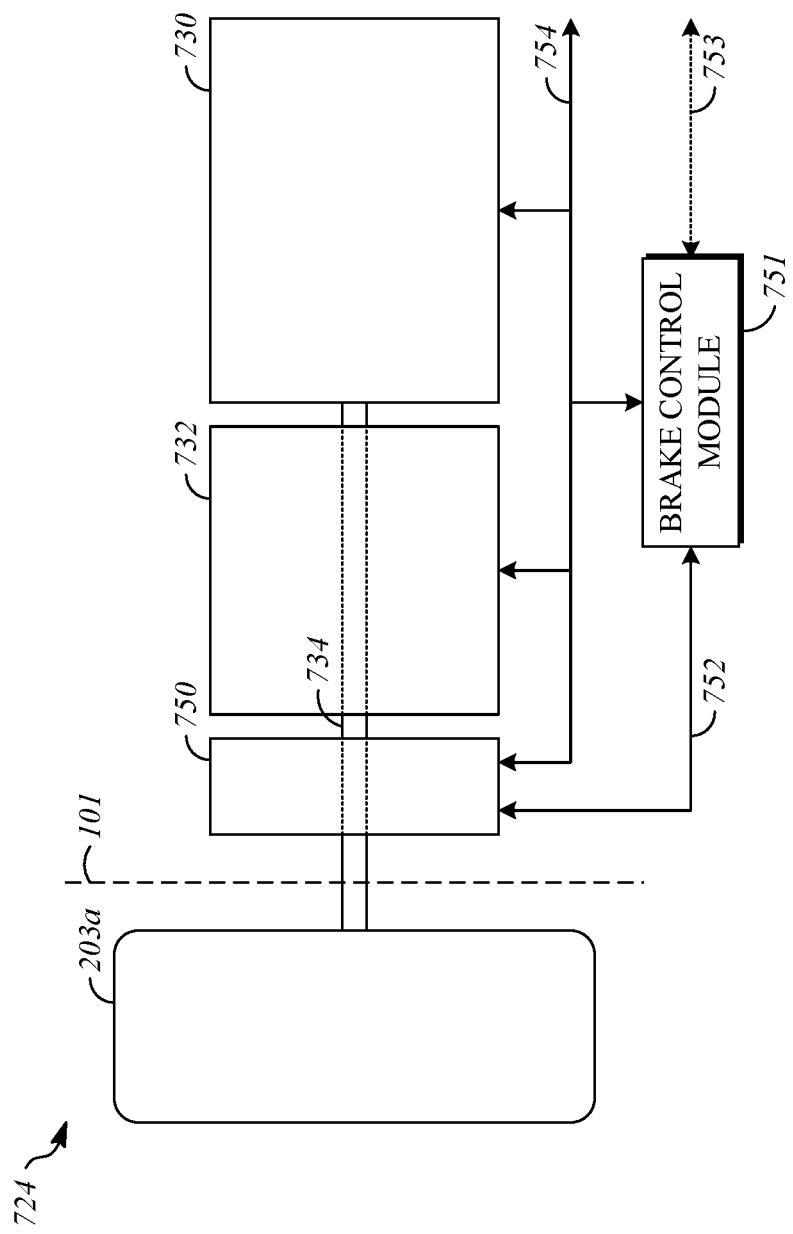
FIG. 7 is an illustration that shows a braking actuator assembly according to a second example.

FIG. 7 is an illustration showing a braking actuator assembly 724 according to a second example. The braking actuator assembly 724 includes a braking actuator 750, a brake control module 751, a control connection 752, an electrical connection 753, and a thermal connection 754, which are configured in the same manner as the braking actuator 650, the brake control module 651, the control connection 652, the electrical connection 653, and the thermal connection 654, except as described herein.

The braking actuator 750 differs from the braking actuator 650 in that the braking actuator 750 is part of the sprung mass of the vehicle 100 and is located within the vehicle body 101. As an example, the braking actuator 750 can be located in the vehicle body 101 laterally inboard relative to one of the road wheels 102, such as the front left wheel 203a. The braking actuator 750 is connected to a propulsion actuator (e.g., the front left propulsion actuator assembly 216a) that includes a motor 730 and a gearbox 732, and is located between the gearbox 732 and the front left wheel 203a. The braking actuator 650 is connected to a gearbox output 734, which can be a shaft that transmits propulsion torque from the gearbox 732 to the front left wheel 203a. The braking actuator 750 includes rotating components that are connected to the gearbox output 734, and non-rotating components that are connected to the vehicle body 101 either directly or indirectly and do not rotate, but are engageable with the rotating components upon application of a braking force to decelerate the front left wheel 203a by decelerating the gearbox output 734.

The thermal connection 754 can be a fluid line that is connected to the braking actuator 750, the brake control module 751, the motor 730, and/or the gearbox 732. The thermal connection 754 is connected to the thermal management subsystem 111 (FIG. 1), which supplies a heated or chilled media to the braking actuator 750, the brake control module 751, the motor 730, and/or the gearbox 732 to maintain desired operating temperature ranges.

Figure 8:
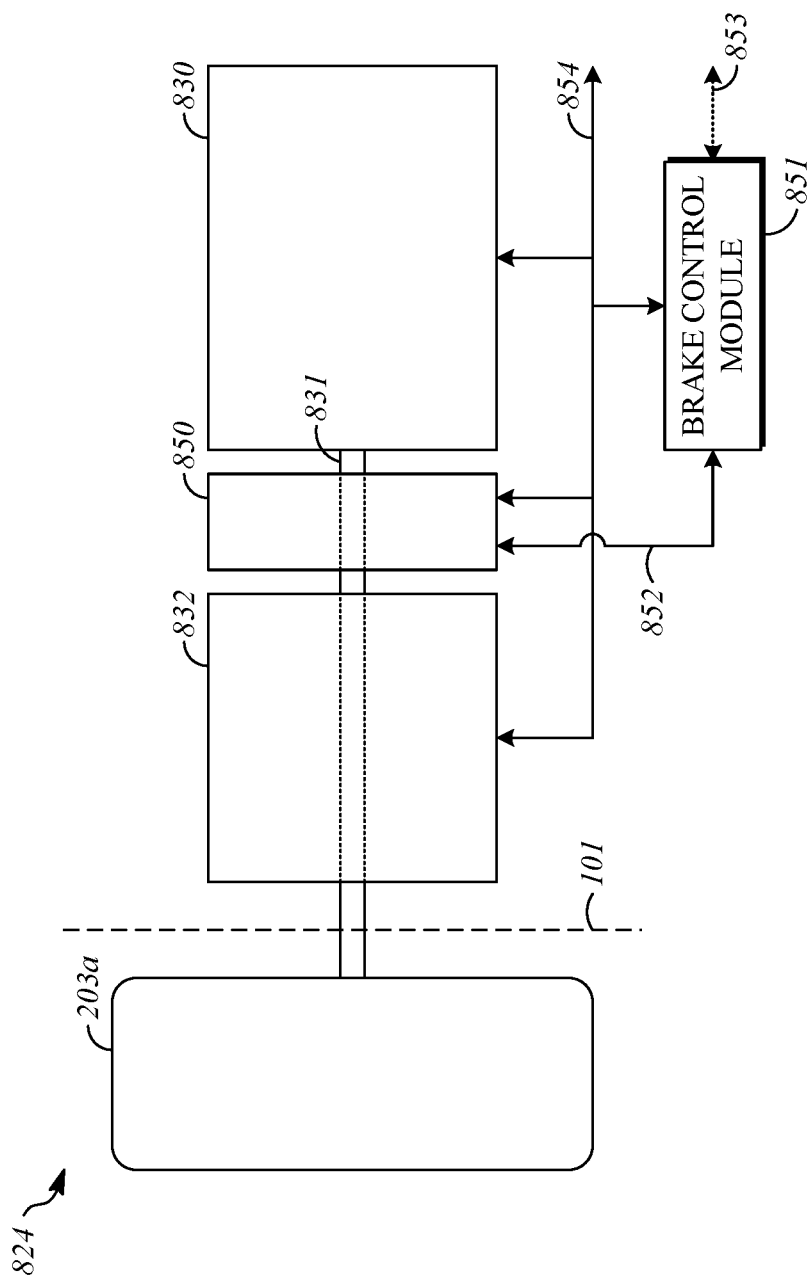
FIG. 8 is an illustration that shows a braking actuator assembly according to a third example.

FIG. 8 is an illustration showing a braking actuator assembly 824 according to a third example. The braking actuator assembly 824 includes a braking actuator 850, a brake control module 851, a control connection 852, an electrical connection 853, and a thermal connection 854, which are configured in the same manner as the braking actuator 650, the brake control module 651, the control connection 652, the electrical connection 653, and the thermal connection 654, except as described herein.

The braking actuator 850 differs from the braking actuator 650 in that the braking actuator 850 is part of the sprung mass of the vehicle 100 and is located within the vehicle body 101. As an example, the braking actuator 850 can be located in the vehicle body 101 laterally inboard relative to one of the road wheels 102, such as the front left wheel 203a. The braking actuator 850 is connected to a propulsion actuator (e.g., the front left propulsion actuator assembly 216a) that includes a motor 830 and a gearbox 832, and is located between the motor 830 and the gearbox 832. The braking actuator 650 is connected to a motor output 831, which can be a shaft that transmits propulsion torque from the motor 830 to the gearbox 832. The braking actuator 850 includes rotating components that are connected to the motor output 831, and non-rotating components that are connected to the vehicle body 101 either directly or indirectly and do not rotate, but are engageable with the rotating components upon application of a braking force to decelerate the front left wheel 203a by decelerating the motor output 831.

The thermal connection 854 can be a fluid line that is connected to the braking actuator 850, the brake control module 851, the motor 830, and/or the gearbox 832. The thermal connection 854 is connected to the thermal management subsystem 111 (FIG. 1), which supplies a heated or chilled media to the braking actuator 850, the brake control module 851, the motor 830, and/or the gearbox 832 to maintain desired operating temperature ranges.

Figure 9:
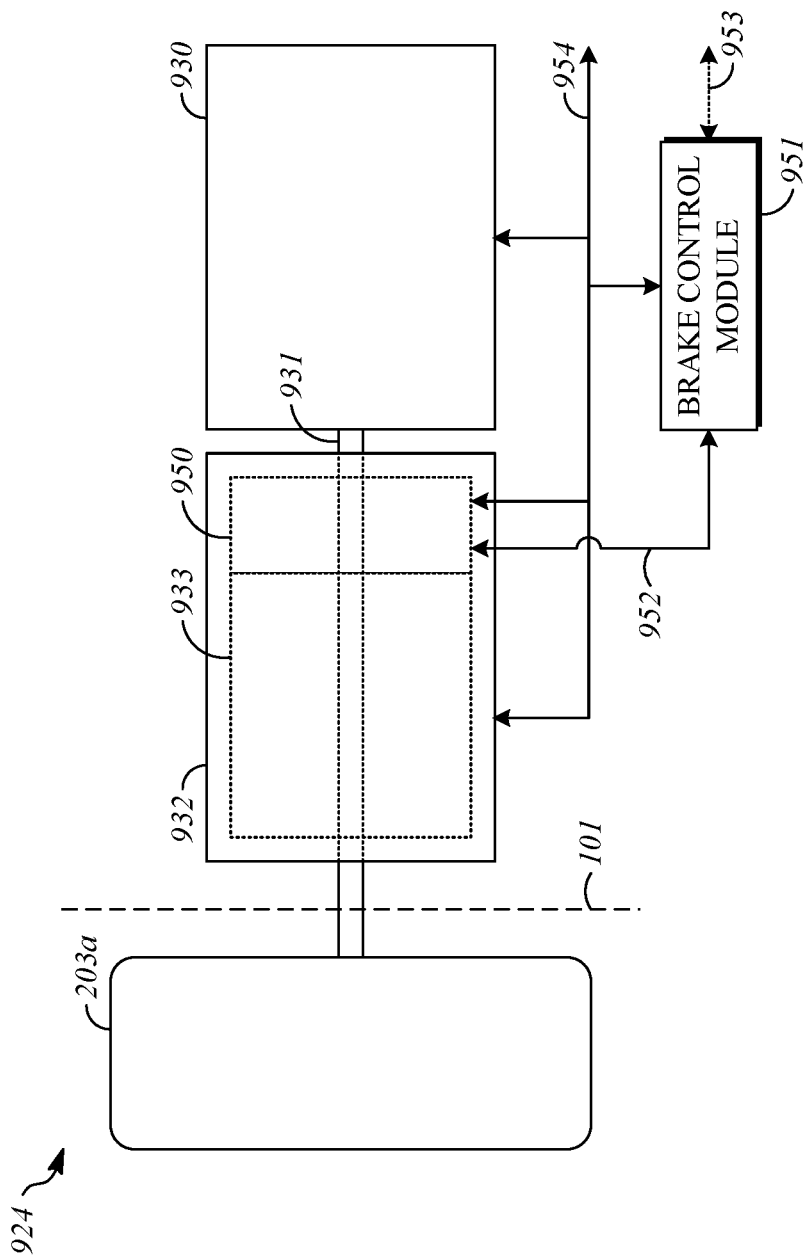
FIG. 9 is an illustration that shows a braking actuator assembly according to a fourth example.

FIG. 9 is an illustration showing a braking actuator assembly 924 according to a fourth example. The braking actuator assembly 924 includes a braking actuator 950, a brake control module 951, a control connection 952, an electrical connection 953, and a thermal connection 954, which are configured in the same manner as the braking actuator 650, the brake control module 651, the control connection 652, the electrical connection 653, and the thermal connection 654, except as described herein.

The braking actuator 950 differs from the braking actuator 650 in that the braking actuator 950 is part of the sprung mass of the vehicle 100 and is located within the vehicle body 101. As an example, the braking actuator 950 can be located in the vehicle body 101 laterally inboard relative to one of the road wheels 102, such as the front left wheel 203a. The braking actuator 950 is connected to a propulsion actuator (e.g., the front left propulsion actuator assembly 216a) that includes a motor 930 and a gearbox 932, and is located within the gearbox 932. The braking actuator 650 is connected to a portion of a gear train 933, which can be configured in the manner described with respect to the gear train 333 (FIG. 3). The braking actuator 950 includes rotating components that are connected to a motor output 931 of the motor 930, and non-rotating components that are connected to the vehicle body 101, for example, indirectly through a housing portion of the gearbox 932, and do not rotate, but are engageable with the rotating components upon application of a braking force to decelerate the front left wheel 203a by decelerating the gear train 933.

The thermal connection 954 can be a fluid line that is connected to the braking actuator 950, the brake control module 951, the motor 930, and/or the gearbox 932. The thermal connection 954 is connected to the thermal management subsystem 111 (FIG. 1), which supplies a heated or chilled media to the braking actuator 950, the brake control module 951, the motor 930, and/or the gearbox 932 to maintain desired operating temperature ranges.

Figure 10:
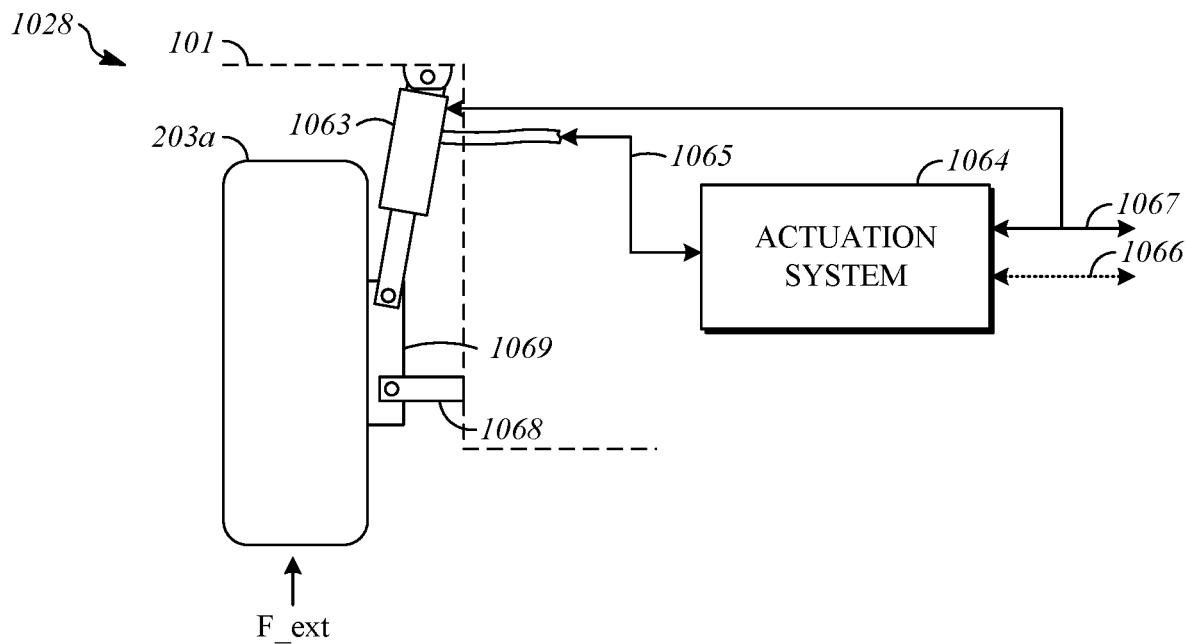
FIG. 10 is an illustration that shows a suspension actuator assembly.

FIG. 10 is an illustration showing a suspension actuator assembly 1028. The suspension actuator assembly 1028 includes a suspension actuator 1063, an actuation system 1064, a control connection 1065, an electrical connection 1066, and a thermal connection 1067.

The suspension actuator assembly 1028 can be utilized in the active suspension subsystem 110, for example as the front left suspension actuator assembly 228a (FIG. 2), and is shown connected to the front left wheel 203a. The suspension actuator assembly 1028 can also be used as the front right suspension actuator assembly 228b, the rear left suspension actuator assembly 228c, or the rear right suspension actuator assembly 228d of the active suspension subsystem 110.

The front left wheel 203a is mechanically connected to the vehicle body 101 in a manner that allows motion relative to the vehicle body 101. As an example, an external force F_ext can be applied to the front left wheel 203a by a road surface during motion of the vehicle 100. The front left wheel 203a can be connected to the vehicle body 101, in part, by the suspension actuator 1063 and a suspension linkage 1068 that are connected to a wheel hub 1069 that is connected to the front left wheel 203a in a manner that allows rotation of the front left wheel 203a relative to the wheel hub 1069. The suspension actuator 1063 is an actively controlled component that can control and/or dampen motion of the front left wheel 203a relative to the vehicle body 101 by applying forces to the front left wheel 203a. During operation of the vehicle 100, the suspension actuator 1063 can be controlled in a desired manner. For example, the suspension actuator 1063 can be controlled to react in a desired manner to the external forces F_ext.

The suspension actuator 1063 is operable to apply force to the front left wheel 203a in an upward direction and a downward direction, as will be explained herein. In one implementation, the suspension actuator 1063 is an electromechanical device that applies force to the front left wheel 203a using, for example, a ball screw mechanism. In another implementation, the suspension actuator 1063 is an electromagnetic device that applies force to the front left wheel 203a by energizing and deenergizing one or more electromagnets. In another implementation, the suspension actuator 1063 is a fluidic device that applies force to the front left wheel 203a by controlling the pressure of fluid within internal chambers of the suspension actuator 1063. Examples of fluidic devices include hydraulic actuators and pneumatic actuators. Combinations of technologies can also be used to implement the suspension actuator 1063. For example, the suspension actuator 1063 could incorporate electromechanical and hydraulic actuation.

The actuation system 1064 is operable to control the operating characteristics of the suspension actuator 1063. In implementations in which the suspension actuator 1063 is electrically actuated, such as with electromechanical configurations and electromagnetic configurations, the control connection 1065 is operable to transmit electrical control signals, the actuation system 1064 provides the electrical control signals to the suspension actuator 1063 using the control connection 1065, and the actuation system 1064 also receives commands from an external controller. In implementations in which the suspension actuator 1063 is hydraulically actuated, the control connection 1065 is operable to transmit hydraulic fluid, the actuation system 1064 includes hydraulic components that facilitate fluid flow to the suspension actuator using the control connection 1065, and the actuation system 1064 and electrical components that can be controlled by commands in the form of signals and/or data to allow operation of the actuation system 1064 by an external controller. In the illustrated example, the actuation system 1064 receives commands from the suspension controller 226 using the electrical connection 1066. The commands from the suspension controller 226 can be generated, at least in part, in response to the external force F_ext. In the illustrated example, the commands cause the actuation system 1064 to exercise control over the suspension actuator 1063 using the control connection 1065.

As will be explained, the actuation system 1064 can cause the front left wheel 203a to move downward relative to the vehicle body 101, and the actuation system 1064 can cause the front left wheel 203a to move upward relative to the vehicle body 101. The actuation system 1064 can cause motion of other ones of the road wheels in a similar manner.

The thermal connection 1067 can be a fluid line that is connected to the suspension actuator 1063 and/or the actuation system 1064. The thermal connection 1067 is connected to the thermal management subsystem 111 (FIG. 1), which supplies a heated or chilled media to the suspension actuator 1063 and/or the actuation system 1064 to maintain desired operating temperature ranges.

Figure 11:
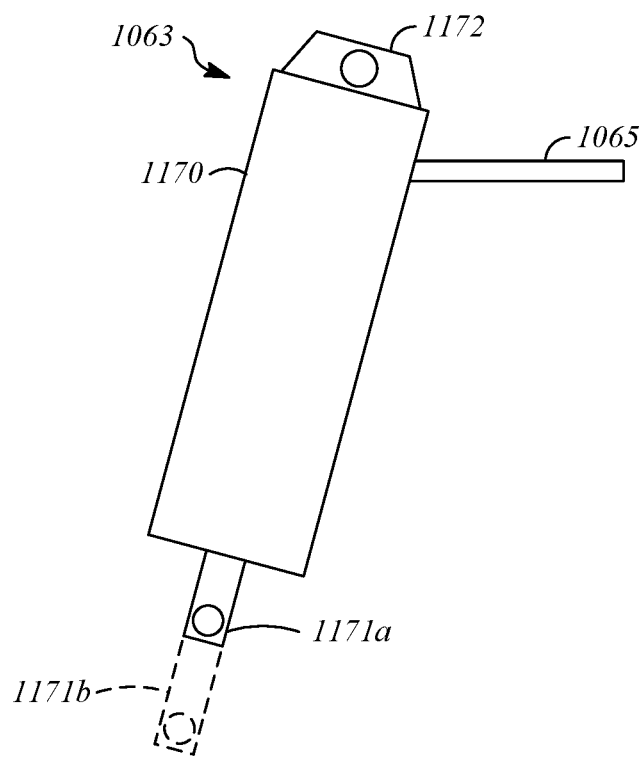
FIG. 11 is an illustration that shows a suspension actuator.

FIG. 11 is an illustration that shows an example of a configuration for the suspension actuator 1063 of the suspension actuator assembly 1028. The suspension actuator 1063 includes a cylinder body 1170, a moveable output structure such as a piston rod 1171a that extends out of the cylinder body 1170 for indirect or direct connection to the wheel hub 1069, and a mounting structure 1172 for connection to the vehicle body 101.

The control connection 1065 is used to operate the suspension actuator 1063 and cause motion of the piston rod 1171a. Downward motion from a retracted of the piston rod 1171a to an extended position 1171b applies a downward force on the front left wheel 203a (FIG. 10) relative to the vehicle body 101. Upward motion from the extended position 1171b causes return to the initial position of the piston rod 1171a and applies an upward force to the front left wheel 203a (FIG. 10) relative to the vehicle body 101.

Figure 12:
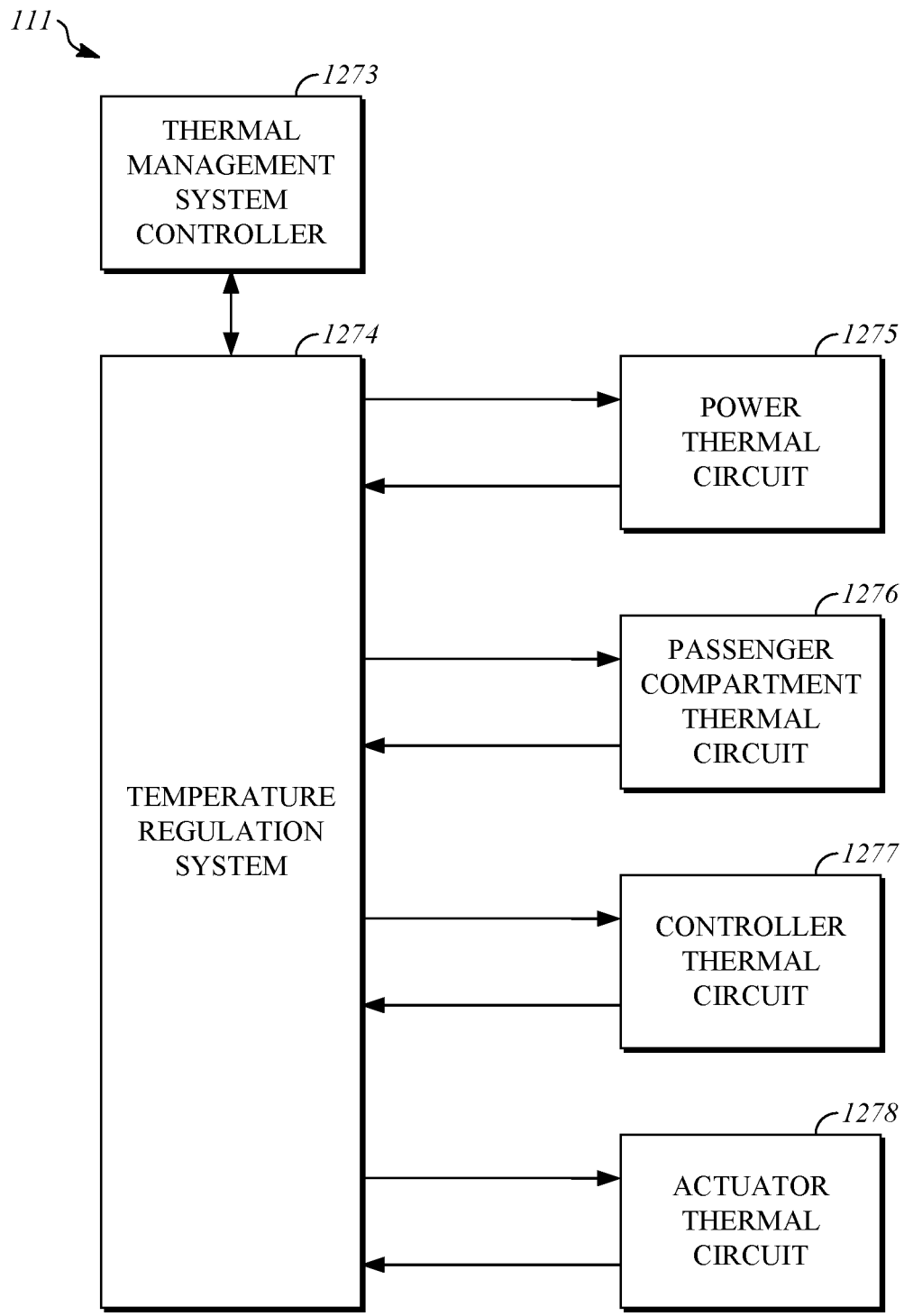
FIG. 12 is an illustration that shows a thermal management subsystem.

FIG. 12 is an illustration showing the thermal management subsystem 111. The thermal management subsystem 111 includes a thermal management system controller 1273, a temperature regulation system 1274, and thermal circuits that circulate heated or chilled media, such as automotive coolant to various systems of the vehicle 100. In the illustrated example, the thermal circuits of the thermal management subsystem 111 include a power thermal circuit 1275, a passenger compartment thermal circuit 1276, a controller thermal circuit 1277, and an actuator thermal circuit 1278.

The thermal management system controller 1273 controls heating and/or cooling of the vehicle systems according to target temperatures. As an example, the thermal management system controller 1273 can utilize default temperatures as the target temperatures for thermal regulation of each of the vehicle systems unless a command is received that modifies the target temperatures. Commands can request a specific temperature or temperature range, and can be received from the vehicle control module 106, or from the various subsystems.

The temperature regulation system 1274 is operable to raise and lower a temperature of the fluid media in order to deliver heated fluid media or chilled fluid media to vehicle systems using the thermal loops. The temperature regulation system 1274 integrates heating and cooling functions for a number of vehicle systems, including the temperature regulation system 1274, the power thermal circuit 1275, the passenger compartment thermal circuit 1276, the controller thermal circuit 1277, and the actuator thermal circuit 1278. Thus, for example, waste heat from any of the vehicle systems regulated by the temperature regulation system 1274 can be utilized to increase the temperature of any other vehicle system, as needed.

The power thermal circuit 1275 circulates the fluid media to the battery 104 and the power management subsystem 112. The power thermal circuit 1275 can supply the heated fluid media to the battery 104 when an actual temperature of the battery 104 and/or the power management subsystem 112 is less than a target temperature range. As examples, the temperature of the battery 104 may be low during a time period immediately after use of the vehicle 100 starts or when ambient temperatures are low. The power thermal circuit 1275 can supply the chilled fluid media to the battery 104 and/or the power management subsystem 112 when the actual temperature of the battery 104 and/or the power management subsystem 112 is greater than the target temperature range. As examples, the temperature of the battery 104 and the power management subsystem 112 may be above the target temperature range during charging and discharging as a result of heat generated by power conversion and by storing and supplying energy by the battery 104.

The passenger compartment thermal circuit 1276 circulates the fluid media to climate control systems that heat and cool a passenger compartment of the vehicle 100. A target temperature range for the passenger compartment can be set by occupants of the passenger compartment, based on occupant preferences, or by an automated system that monitors thermal comfort states for the occupants. Heated fluid media can be supplied by the passenger compartment thermal circuit 1276 when an actual temperature of the passenger compartment is below the target temperature range, and chilled fluid media can be supplied by the passenger compartment thermal circuit 1276 when the actual temperature of the passenger compartment is above the target temperature range.

The controller thermal circuit 1277 circulates the fluid media to computing devices in the vehicle 100. The controller thermal circuit 1277 can regulate the temperature of, as examples, the vehicle control module 106, the propulsion controller 214, the steering controller 218, the braking controller 222, and the suspension controller 226. Heated fluid media can be supplied to the computing devices when actual temperatures of any or all of them are below target temperature range for the controller thermal circuit 1277, and chilled fluid media can be supplied when the actual temperature of any or all of the computing devices are above the target temperature range.

The actuator thermal circuit 1278 circulates the fluid media to the vehicle actuators. As examples, the actuator thermal circuit 1278 can circulate the fluid media to the front left propulsion actuator assembly 216a, the front right propulsion actuator assembly 216b, the rear left propulsion actuator assembly 216c, the rear right propulsion actuator assembly 216d, the front left steering actuator assembly 220a, the front right steering actuator assembly 220b, the rear left steering actuator assembly 220c, the rear right steering actuator assembly 220d, the front left braking actuator assembly 224a, the front right braking actuator assembly 224b, the rear left braking actuator assembly 224c, the rear right braking actuator assembly 224d, the front left suspension actuator assembly 228a, the front right suspension actuator assembly 228b, the rear left suspension actuator assembly 228c, and the rear right suspension actuator assembly 228d. Individual actuators or groups of actuators can be served by separate portions of the actuator thermal circuit 1278, which may be subject to separate control and thermal conditioning by the thermal management system controller 1273 and the temperature regulation system 1274. Heated fluid media can be supplied when actual temperatures of any or all of the actuators are below target temperature ranges, and chilled fluid media can be supplied when the actual temperature of any of all of the actuators are above the target temperature ranges.

Figure 13:
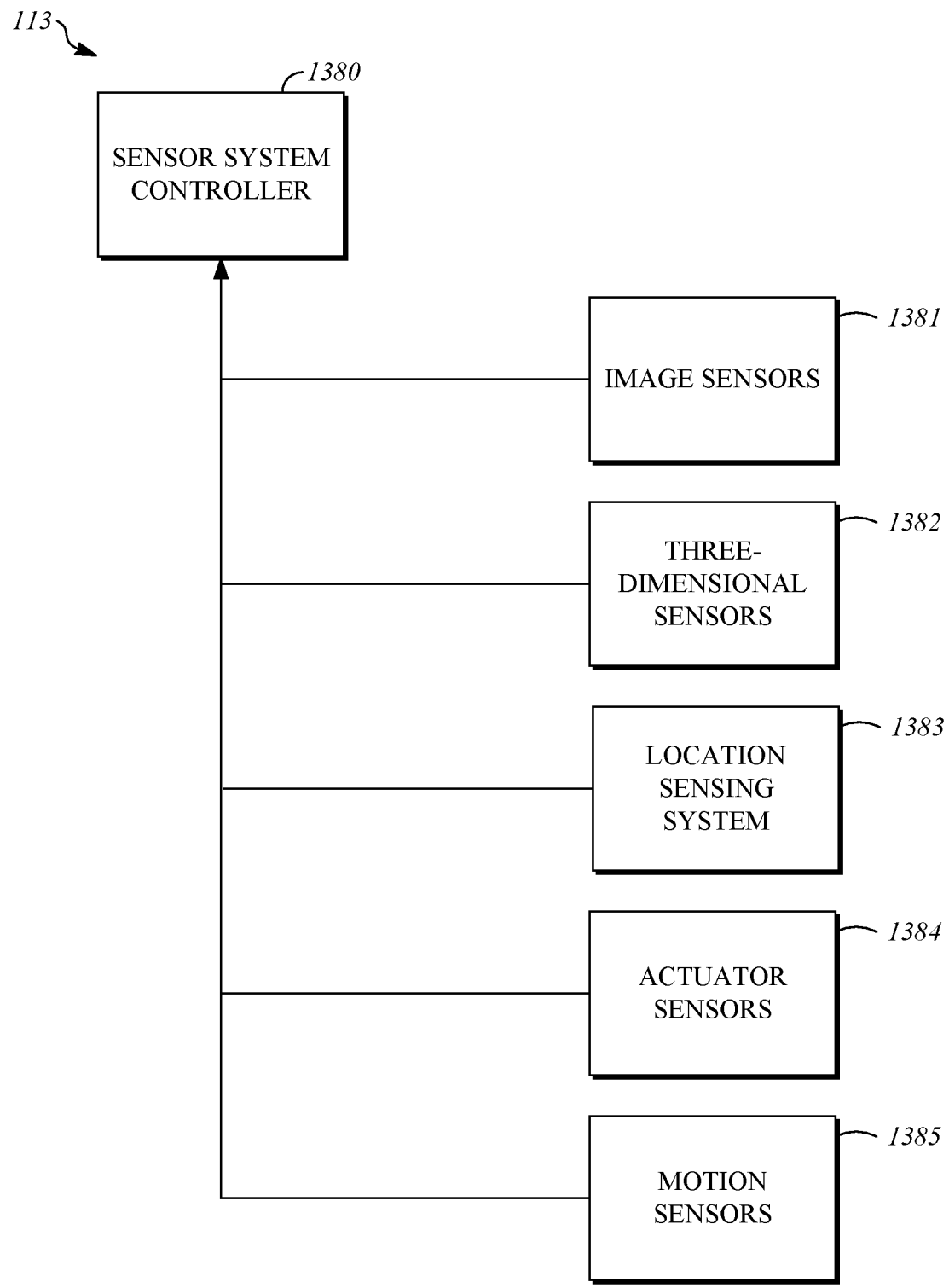
FIG. 13 is an illustration that shows a sensor subsystem.

FIG. 13 is an illustration that shows the sensor subsystem 113. The sensor subsystem 113 includes sensors that obtain information about operation of the vehicle 100, motion of the vehicle 100, and the environment around the vehicle 100. In the illustrated example, the sensor subsystem 113 includes a sensor system controller 1380, one or more image sensors 1381, one or more three-dimensional sensors 1382, a location sensing system 1383, actuator sensors 1384, and motion sensors 1385.

The sensor controller 1380 collects and distributes sensor readings from the various systems of the vehicle 100. This allows sensors readings to be made available to all vehicle systems as needed. The information collected by the sensor controller 1380 can be used, for example, by the vehicle control module 106 to determine a destination, route, trajectory, and control strategy for the vehicle 100. The sensor controller 1380 is optional, and can be omitted in some implementations.

The image sensors 1381 capture images of the environment outside of the vehicle 100 and/or inside the passenger compartment of the vehicle 100. The image sensors 1381 can be visible-spectrum cameras, or can be configured to capture images representing electromagnetic radiation outside of the visible spectrum (e.g., infrared). The output of the image sensors 1381 can be a series of raster images, with portions (e.g., pixels) of the image representing the color and/or intensity of visible light or electromagnetic radiation outside of the visible spectrum. The three-dimensional sensors 1382 capture information describing the distance to objects in the environment around the vehicle 100. As examples, the three-dimensional sensors 1382 may include LIDAR devices, radar sensors, ultrasonic sensors, and structured light sensors. The location sensing system 1383 is operable to receive information describing the spatial location of the vehicle 100, for example, in terms of latitude and longitude coordinates, to support navigation functions and control functions of the vehicle 100. The location sensing system 1383 can include, for example, a satellite positioning receiver (e.g., GPS). The actuator sensors 1384 include various sensors that are included in the actuator systems. For example, the braking subsystem 109 may include wheel speed sensors that are considered members of the actuator sensors 1384. The motion sensors 1385 include sensors that are operable to detect and output information describing motion of the vehicle 100. The motion sensors 1385 may include, as example, speed sensors, accelerometers, gyroscopes, and/or inertial measurement units.

Figure 14:
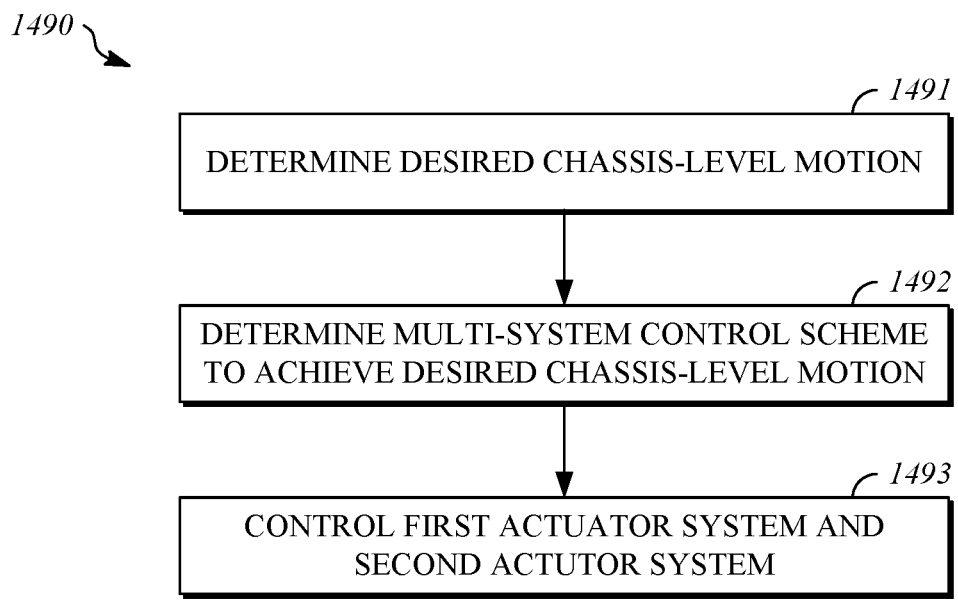
FIG. 14 is a flowchart that shows a first example of a control process for the vehicle.

FIG. 14 is a flowchart that shows a first example of a control process 1490 for the vehicle 100. In the control process 1490, multiple actuators are controlled according to a multi-system control scheme in order to achieve a desired chassis-level motion. The control process 1490 may be implemented using the vehicle control module 106 and one or more vehicle subsystems, such as the propulsion subsystem 107, the steering subsystem 108, the braking subsystem 109, the active suspension subsystem 110, the thermal management subsystem 111, the power management subsystem 112, and the sensor subsystem 113. The control process 1490 can be controlled by software that is provided to and executed by the vehicle control module 106. In some implementations portions of the control process 1490 may be controlled and executed by other systems, such as the propulsion subsystem 107, the steering subsystem 108, the braking subsystem 109, the active suspension subsystem 110, the thermal management subsystem 111, the power management subsystem 112, and the sensor subsystem 113.

In operation 1491, a desired chassis-level motion is determined. The desired-chassis level motion can be determined by the vehicle control module 106 to cause the vehicle 100 to follow a trajectory. The trajectory can be determined by the vehicle control module according to a navigation goal based on a destination that is specified by a passenger or an external control system. The desired chassis-level motion can include one or more of a speed, an acceleration, a yaw rate, a pitch rate, a roll rate, a yaw moment, a pitch moment, or a roll moment. The desired chassis-level motion can be determined using an automated control function based on a desired trajectory. The desired chassis-level motion can be determined by the vehicle control module 106.

In operation 1492, a multi-system control strategy is determined to achieve the desired chassis-level motion. The vehicle control module 106 can identify one or more actuator systems that are able to cause or contribute to the desired chassis-level motion. As an example, if the desired chassis-level motion includes a pitch moment, the vehicle control module can identify the propulsion subsystem 107 and the active suspension subsystem 110 based on their ability to contribute to the desired motion. Component chassis-level motions to be allocated to each of the systems are then determined by the vehicle control module 106, where the component chassis-level motions, in combination, are equivalent to the desired chassis-level motion. In one implementation component chassis-level motions can be determined using a vehicle dynamics model that is configured to estimate the motion of the vehicle 100 in response to a specific set of conditions and actuator inputs.

Different multi-system control strategies can be considered that allocate actuator effort differently among the available actuators. The different multi-system control strategies can be compared based on any suitable factor or factors. One factor that can be considered is a maximum possible contribution to a motion by each of the actuator systems. Another factor that can be considered is energy usage of each of the actuator systems to achieve the desired chassis-level motions. As one example, the capabilities of each of the actuator systems can be utilized to choose a control scheme that allocates actuator effort for the desired chassis-level motions to the actuator systems. As another example, a cost function can be utilized to allocate actuator effort for the desired chassis-level motions to the actuator systems, by optimizing for one or more of, as examples, energy efficiency, comfort, or controllability.

In operation 1493, at least a first actuator system and a second actuator system are controlled to achieve the desired chassis-level-motion. Optionally, additional actuator systems can also be controlled to achieve the desired chassis-level motion. Continuing the previous example, a first command can be transmitted from the vehicle control module 106 to the propulsion subsystem 107 according to a first component of the desired chassis-level motion, and a second command can be transmitted from the vehicle control module 106 to the active suspension subsystem 110 according to a second component of the desired chassis-level motion to cause the propulsion subsystem 107 and the active suspension subsystem 110 to cooperate to achieve the desired chassis-level motion.

Figure 15:
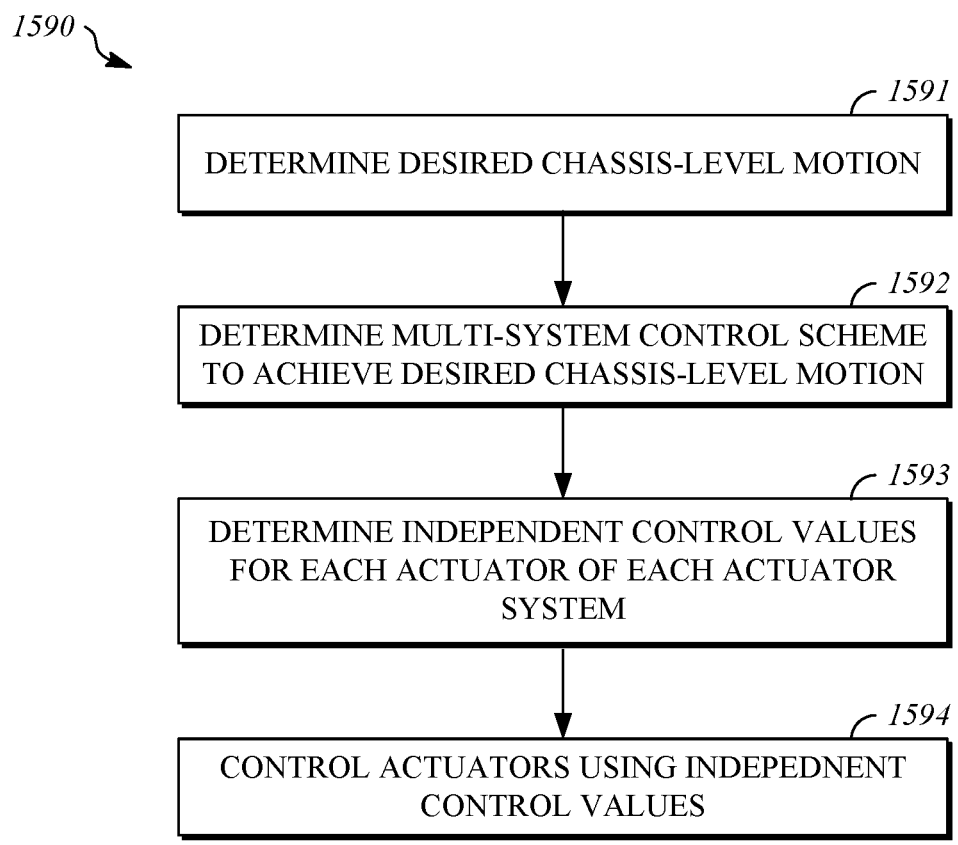
FIG. 15 is a flowchart that shows a second example of a control process for the vehicle.

FIG. 15 is a flowchart that shows a second example of a control process 1590 for the vehicle 100. The control process 1590 may be implemented using the vehicle control module 106 and one or more vehicle subsystems, such as the propulsion subsystem 107, the steering subsystem 108, the braking subsystem 109, the active suspension subsystem 110, the thermal management subsystem 111, the power management subsystem 112, and the sensor subsystem 113. The control process 1590 can be controlled by software that is provided to and executed by the vehicle control module 106. In some implementations portions of the control process 1590 may be controlled and executed by other systems, such as the propulsion subsystem 107, the steering subsystem 108, the braking subsystem 109, the active suspension subsystem 110, the thermal management subsystem 111, the power management subsystem 112, and the sensor subsystem 113.

In operation 1591, a desired chassis-level motion is determined. The desired-chassis level motion can be determined by the vehicle control module 106 to cause the vehicle 100 to follow a trajectory. The trajectory can be determined by the vehicle control module according to a navigation goal based on a destination that is specified by a passenger or an external control system. The desired chassis-level motion can include one or more of a speed, an acceleration, a yaw rate, a pitch rate, a roll rate, a yaw moment, a pitch moment, or a roll moment. The desired chassis-level motion can be determined using an automated control function based on a desired trajectory. The desired chassis-level motion can be determined by the vehicle control module 106.

In operation 1592, a multi-system control strategy is determined to achieve the desired chassis-level motion. The vehicle control module 106 can identify one or more actuator systems that are able to cause or contribute to the desired chassis-level motion. As an example, if the desired chassis-level motion includes a pitch moment, the vehicle control module can identify the propulsion subsystem 107 and the active suspension subsystem 110 based on their ability to contribute to the desired motion. Component chassis-level motions to be allocated to each of the systems are then determined by the vehicle control module 106, where the component chassis-level motions, in combination, are equivalent to the desired chassis-level motion. In one implementation component chassis-level motions can be determined using a vehicle dynamics model that is configured to estimate the motion of the vehicle 100 in response to a specific set of conditions and actuator inputs.

In operation 1593, independent control values are determined for each individual actuator of each of the actuator systems, according to the multi-system control strategy that was determined in operation 1592. The independent control values are determined to cause the individual actuators of each actuator system to operate such that the combined effort of the actuators within the particular actuator system (e.g., the propulsion subsystem 107, the steering subsystem 108, the braking subsystem 109, the active suspension subsystem 110) matches the component chassis-level motion that was allocated to the respective actuator system in operation 1593. The individual actuator commands can be determined, for example, using a model that estimates an expected vehicle response for a set of actuator behaviors according to a vehicle dynamics model, as previously described.

In one implementation, the individual actuator commands are determined by the vehicle control module 106. In another implementation, vehicle control module 106 transmits information from the multi-system control strategy of operation 1593 to one or more (e.g., each) of the propulsion controller 214, the steering controller 218, the braking controller 222, and the suspension controller 226 which determine individual actuator commands for their respective individual actuators.

In operation 1594, the actuators of the actuator systems are controlled independently to achieve the desired chassis-level-motion. Operation 1594 can include transmitting commands to each of the front left propulsion actuator assembly 216a, the front right propulsion actuator assembly 216b, the rear left propulsion actuator assembly 216c, the rear right propulsion actuator assembly 216d, the front left steering actuator assembly 220a, the front right steering actuator assembly 220b, the rear left steering actuator assembly 220c, the rear right steering actuator assembly 220d, the front left braking actuator assembly 224a, the front right braking actuator assembly 224b, the rear left braking actuator assembly 224c, the rear right braking actuator assembly 224d, the front left suspension actuator assembly 228a, the front right suspension actuator assembly 228b, the rear left suspension actuator assembly 228c, and the rear right suspension actuator assembly 228d.

Figure 16:
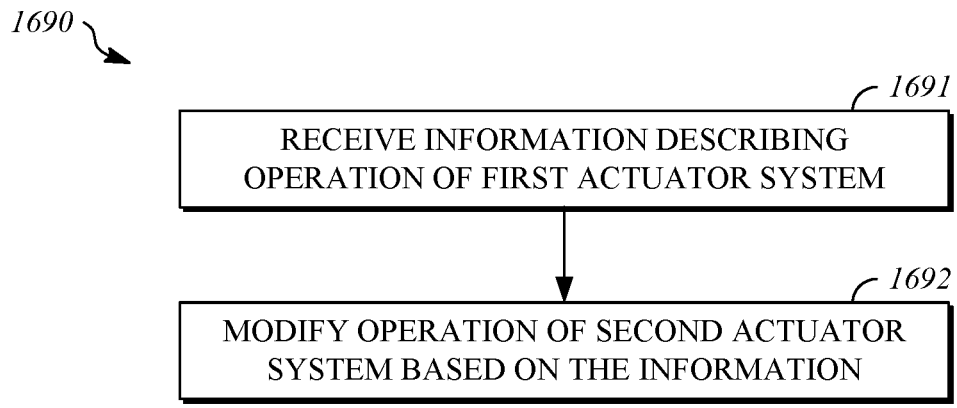
FIG. 16 is a flowchart that shows a third example of a control process for the vehicle.

FIG. 16 is a flowchart that shows a third example of a control process 1690 for the vehicle 100. The control process 1690 may be implemented using the vehicle control module 106 and one or more vehicle subsystems, such as the propulsion subsystem 107, the steering subsystem 108, the braking subsystem 109, the active suspension subsystem 110, the thermal management subsystem 111, the power management subsystem 112, and the sensor subsystem 113. The control process 1690 can be controlled by software that is provided to and executed by the vehicle control module 106. In some implementations portions of the control process 1690 may be controlled and executed by other systems, such as the propulsion subsystem 107, the steering subsystem 108, the braking subsystem 109, the active suspension subsystem 110, the thermal management subsystem 111, the power management subsystem 112, and the sensor subsystem 113.

In operation 1691, information is received that describes operation of a first actuator system. The information can be received at the vehicle control module 106 from one of the propulsion subsystem 107, the steering subsystem 108, the braking subsystem 109, or the active suspension subsystem 110.

In operation 1692, operation of a second actuator system is modified in response to the information that was received in operation 1691. As an example, the vehicle control module 106 can identify a change to be made to the manner of operation of one of the propulsion subsystem 107, the steering subsystem 108, the braking subsystem 109, or the active suspension subsystem 110, and transmit a command to that system that causes modification of its operation.

As one example, the braking subsystem 109 can transmit information to the vehicle control module 106 that describes operating characteristics of components of the braking subsystem 109 while braking torques are applied at one or more of the road wheels 102. In response to the information received from the braking subsystem 109, the vehicle control module 106 can determine that a current control strategy should be modified. As one example, the vehicle control module 106 can determine that the information received from the braking subsystem 109 does not match a desired result of the current control strategy, and modify the control strategy in response by changing operation of another actuator system, such as the propulsion subsystem 107 to achieve the desired result using combined effort from the braking subsystem 109 and the propulsion subsystem 107.

As another example, the braking subsystem 109 can transmit information to the vehicle control module 106 that describes operating characteristics of components of the braking subsystem 109 while braking torques are applied at one or more of the road wheels 102. In response to the information received from the braking subsystem 109, the vehicle control module 106 can determine that the information received from the braking subsystem 109 is indicative of a mechanical or electrical fault. Upon determining that a mechanical or electrical fault is present, the vehicle control module 106 can respond by changing operation of another actuator system, such as the propulsion subsystem 107 to replace some or all of the actuator effort that was allocated to the braking subsystem 109.

The control process 1690 can be expanded to include monitoring multiple actuator systems and/or modifying operation of multiple actuator systems. For example, operation 1691 could include receiving information from two actuator systems, and in response, operation 1692 could include modifying operation of two or more actuator systems.

Figure 17:
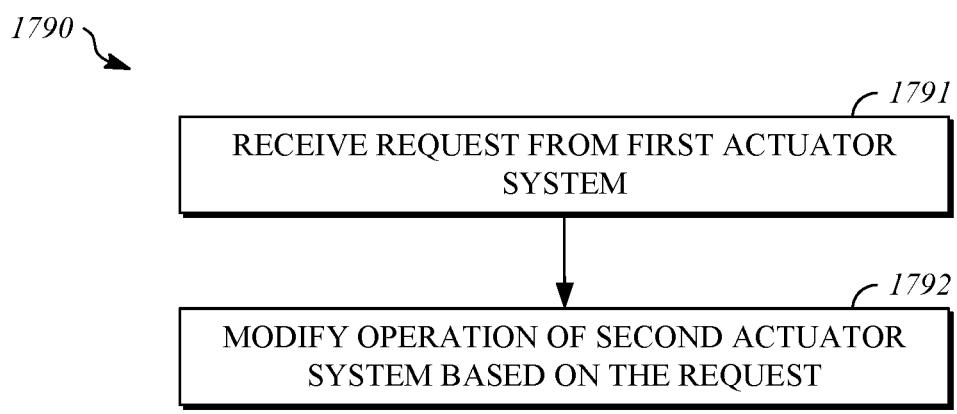
FIG. 17 is a flowchart that shows a fourth example of a control process for the vehicle.

FIG. 17 is a flowchart that shows a fourth example of a control process 1790 for the vehicle 100. The control process 1790 may be implemented using the vehicle control module 106 and one or more vehicle subsystems, such as the propulsion subsystem 107, the steering subsystem 108, the braking subsystem 109, the active suspension subsystem 110, the thermal management subsystem 111, the power management subsystem 112, and the sensor subsystem 113. The control process 1790 can be controlled by software that is provided to and executed by the vehicle control module 106. In some implementations portions of the control process 1790 may be controlled and executed by other systems, such as the propulsion subsystem 107, the steering subsystem 108, the braking subsystem 109, the active suspension subsystem 110, the thermal management subsystem 111, the power management subsystem 112, and the sensor subsystem 113.

In operation 1791, a request is received from a first actuator system. As one example, the first actuator system can transmit a request for additional actuator effort to achieve an intended vehicle motion in response to determining, by the first actuator system, that the first actuator system is not capable of achieving a vehicle motion that was requested. As another example, the first actuator system can transmit a request for a reduction in the actuator effort assigned to it in response to determining, by the first actuator system, that the first actuator system is not functioning correctly. The request can be received at the vehicle control module 106 from one of the propulsion subsystem 107, the steering subsystem 108, the braking subsystem 109, or the active suspension subsystem 110.

In operation 1792, operation of a second actuator system is modified in response to the request that was received in operation 1791. The vehicle control module 106 can identify a change to be made to the manner of operation of one of the propulsion subsystem 107, the steering subsystem 108, the braking subsystem 109, or the active suspension subsystem 110, and transmit a command to that system that causes modification of its operation.

As one example the steering subsystem 108 can transmit information to the vehicle control module 106 that requests modification of a current control strategy in which the steering subsystem 108 is attempting to achieve a specific yaw moment for the vehicle 100. In response to the information received from the steering subsystem 108, the vehicle control module 106 can determine that a current control strategy should be modified. As one example, the vehicle control module 106 can determine that the information received from the steering subsystem 108 does not match a desired result of the current control strategy, and modify the control strategy in response by changing operation of another actuator system, such as by operating the braking subsystem 109 to induce a portion of the desired yaw moment to turn the vehicle 100, in an attempt to achieve the desired result using combined effort from the steering subsystem 108 and the braking subsystem 109.

The control process 1790 can be expanded to include monitoring multiple actuator systems and/or modifying operation of multiple actuator systems. For example, operation 1791 could include receiving a request from one actuator system, and in response, operation 1792 could include modifying operation of two or more actuator systems.

Figure 18:
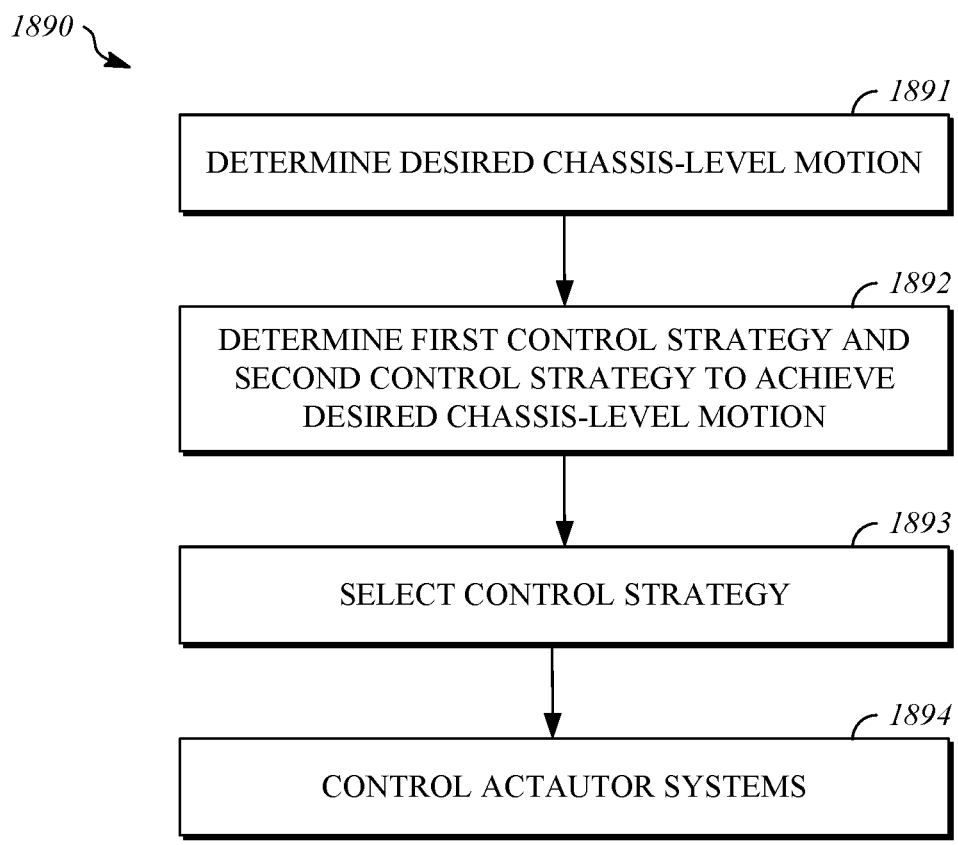
FIG. 18 is a flowchart that shows a fifth example of a control process for the vehicle.

FIG. 18 is a flowchart that shows a fifth example of a control process 1890 for the vehicle 100. The control process 1890 may be implemented using the vehicle control module 106 and one or more vehicle subsystems, such as the propulsion subsystem 107, the steering subsystem 108, the braking subsystem 109, the active suspension subsystem 110, the thermal management subsystem 111, the power management subsystem 112, and the sensor subsystem 113. The control process 1890 can be controlled by software that is provided to and executed by the vehicle control module 106. In some implementations portions of the control process 1890 may be controlled and executed by other systems, such as the propulsion subsystem 107, the steering subsystem 108, the braking subsystem 109, the active suspension subsystem 110, the thermal management subsystem 111, the power management subsystem 112, and the sensor subsystem 113.

In operation 1891, a desired chassis-level motion is determined. The desired-chassis level motion can be determined by the vehicle control module 106 to cause the vehicle 100 to follow a trajectory. The trajectory can be determined by the vehicle control module according to a navigation goal based on a destination that is specified by a passenger or an external control system. The desired chassis-level motion can include one or more of a speed, an acceleration, a yaw rate, a pitch rate, a roll rate, a yaw moment, a pitch moment, or a roll moment. The desired chassis-level motion can be determined using an automated control function based on a desired trajectory. The desired chassis-level motion can be determined by the vehicle control module 106.

In operation 1892, a first control strategy and a second control strategy are determined. The first control strategy and the second control strategy are each intended to achieve the desired chassis-level motion, but differ from one another. As one example, the first control strategy and the second control strategy can differ by the actuators systems selected to achieve the desired chassis-level motion. As another example, the first control strategy and the second control strategy can utilize the same actuator systems to achieve the desired chassis-level motion, but allocate the effort differently among the involved actuator systems. As an example, if the desired chassis-level motion includes a pitch moment, the vehicle control module can determine a first control strategy using the propulsion subsystem 107 and the active suspension subsystem 110 based on their ability to contribute to the desired motion, and can identify a second control strategy using the braking subsystem 109 and the active suspension subsystem 110 based on their ability to contribute to the desired motion. Optionally, further control strategies can be determined in operation 1892 in addition to the first control strategy and the second control strategy.

In operation 1893, a control strategy is selected. The control strategy that is selected at operation 1893 may be referred to as a selected control strategy. The control strategies that were determined in operation 1892 are evaluated to identify the selected control strategy. This selection can be made based on one or more criteria, such as by comparing the one or more criteria for the first control strategy and the second control strategy. As examples, the selection can be made based on operating characteristics or criteria such as one or more of energy efficiency, comfort, and controllability. The selection can be made using any type of selection methodology. One example of a selection methodology that can be utilized is a cost function, and the parameters of the cost function can be adjusted to favor optimization of specific operating characteristics by selecting the control strategy that minimizes or maximizes values for these characteristics or criteria, as desired.

In operation 1894, one or more of the actuator systems are controlled using the selected control strategy. For example, commands can be transmitted to one or more of the propulsion subsystem 107, the steering subsystem 108, the braking subsystem 109, and the active suspension subsystem 110.

Figure 19:
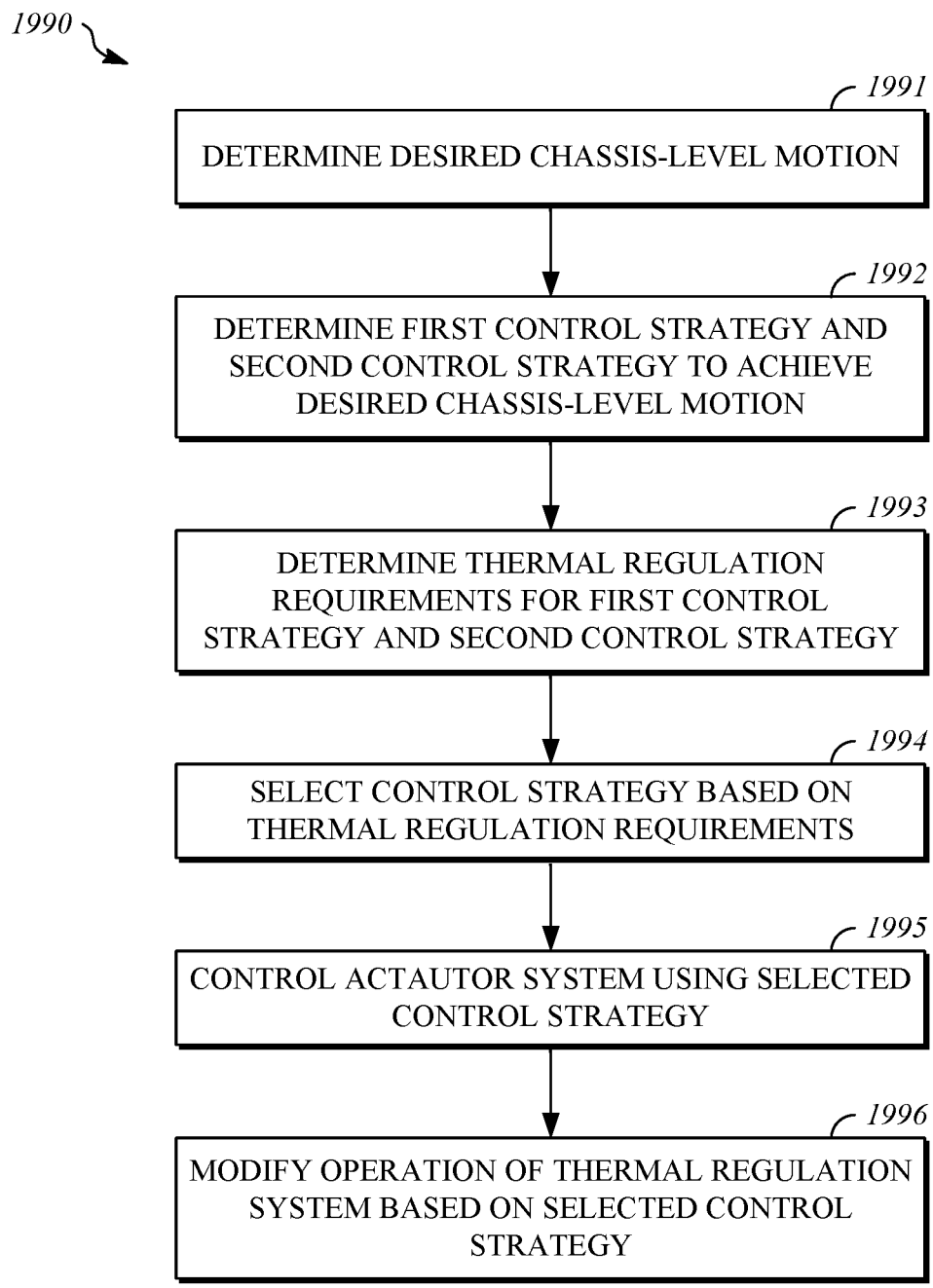
FIG. 19 is a flowchart that shows a sixth example of a control process for the vehicle.

FIG. 19 is a flowchart that shows a sixth example of a control process 1990 for the vehicle 100. The control process 1990 may be implemented using the vehicle control module 106 and one or more vehicle subsystems, such as the propulsion subsystem 107, the steering subsystem 108, the braking subsystem 109, the active suspension subsystem 110, the thermal management subsystem 111, the power management subsystem 112, and the sensor subsystem 113. The control process 1990 can be controlled by software that is provided to and executed by the vehicle control module 106. In some implementations portions of the control process 1990 may be controlled and executed by other systems, such as the propulsion subsystem 107, the steering subsystem 108, the braking subsystem 109, the active suspension subsystem 110, the thermal management subsystem 111, the power management subsystem 112, and the sensor subsystem 113.

In operation 1991, a desired chassis-level motion is determined. The desired-chassis level motion can be determined by the vehicle control module 106 to cause the vehicle 100 to follow a trajectory. The trajectory can be determined by the vehicle control module according to a navigation goal based on a destination that is specified by a passenger or an external control system. The desired chassis-level motion can include one or more of a speed, an acceleration, a yaw rate, a pitch rate, a roll rate, a yaw moment, a pitch moment, or a roll moment. The desired chassis-level motion can be determined using an automated control function based on a desired trajectory. The desired chassis-level motion can be determined by the vehicle control module 106.

In operation 1992, a first control strategy and a second control strategy are determined. The first control strategy and the second control strategy are each intended to achieve the desired chassis-level motion, but differ from one another. Operation 1992 can be performed in the manner previously described with respect to operation 1892. Optionally, further control strategies can be determined in operation 1992 in addition to the first control strategy and the second control strategy.

In operation 1993, thermal regulation requirements are determined for the first control strategy and the second control strategy. Thermal regulation requirements can optionally be determined for additional control strategies, if any. The thermal regulation requirements for each control plan can be determined based on the actuator effort allocated to each of the actuator systems. To determine the thermal regulation requirements, the vehicle control module 106 can be provided with information that correlates actuator effort for each of the actuator systems with an amount of heat generated by the actuator systems. This information can be in the form of, as examples, a function or a lookup table.

In operation 1994, a control strategy is selected. The control strategy that is selected at operation 1994 may be referred to as a selected control strategy. The control strategies that were determined in operation 1992 are evaluated to identify the selected control strategy. This selection is made based in part of the thermal regulation requirements that were determined in operation 1993. The selection can be made using any type of selection methodology. One example of a selection methodology that can be utilized is a cost function. As one example, the parameters of the cost function can be set to favor control strategies that maintain temperatures for the actuator system within desired ranges. As another example, the parameters of the cost function can be set to favor control strategies that minimize energy usage by the thermal management subsystem 111.

In operation 1995, the actuator systems are controlled using the selected control strategy that was selected in operation 1994. For example, commands can be transmitted to one or more of the propulsion subsystem 107, the steering subsystem 108, the braking subsystem 109, and the active suspension subsystem 110.

In operation 1996, operation of the thermal management subsystem 111 is modified based on the selected control strategy. The thermal management subsystem 111 can be controlled in accordance with the thermal regulation requirements for the selected control strategy to maintain the actuator systems within desired temperature ranges.

What is claimed is:

1. A vehicle, comprising:
   a vehicle body;
   road wheels that are connected to the vehicle body;
   a propulsion system that is operable to independently control propulsion torque to each of the road wheels;
   a steering system that is operable to independently control a steering angle of each of the road wheels;
   a braking system that is operable to independently control braking torque to each of the road wheels;
   an active suspension system that regulates motion of the road wheels with respect to the vehicle body by independently controlling application of force to each of the road wheels; and
   a vehicle control module that is operable to determine a desired chassis-level motion, determine a control strategy to achieve the desired chassis-level motion, and output commands to each of the propulsion system, the steering system, the braking system, and the active suspension system to achieve the desired chassis-level motion, wherein the vehicle control module is operable to modify operation of at least one of the propulsion system, the steering system, the braking system, or the active suspension system based on a request received from another of the propulsion system, the steering system, the braking system, or the active suspension system.

2. The vehicle of claim 1, wherein the commands to the propulsion system from the vehicle control module include independent propulsion commands corresponding to each of the road wheels, the commands to the steering system from the vehicle control module include independent steering commands corresponding to each of the road wheels, the commands to the braking system from the vehicle control module include independent braking commands corresponding to each of the road wheels, and the commands to the active suspension system from the vehicle control module include independent active suspension commands corresponding to each of the road wheels.

3. The vehicle of claim 1, wherein the commands to each of the propulsion system, the steering system, the braking system, and the active suspension system describe a respective allocated portion of the desired chassis-level motion.

4. The vehicle of claim 3, wherein the propulsion system includes a propulsion controller that is operable to determine independent propulsion commands corresponding to each of the road wheels based on the respective allocated portion of the desired chassis-level motion for the propulsion system.

5. The vehicle of claim 4, wherein the steering system includes a steering controller that is operable to determine independent steering commands corresponding to each of the road wheels based on the respective allocated portion of the desired chassis-level motion for the steering system.

6. The vehicle of claim 5, wherein the braking system includes a braking controller that is operable to determine independent braking commands corresponding to each of the road wheels based on the respective allocated portion of the desired chassis-level motion for the braking system.

7. The vehicle of claim 6, wherein the active suspension system includes a suspension controller that is operable to determine independent active suspension commands corresponding to each of the road wheels based on the respective allocated portion of the desired chassis-level motion for the active suspension system.

8. The vehicle of claim 1, wherein the vehicle control module is operable to receive information describing operating characteristics for each of the propulsion system, the steering system, the braking system, and the active suspension system.

9. The vehicle of claim 8, wherein the vehicle control module, based on information received from at least one of the propulsion system, the steering system, the braking system, or the active suspension system, modifies operation of another of the propulsion system, the steering system, the braking system, or the active suspension system.

10. The vehicle of claim 1, wherein the vehicle control module determines the desired chassis-level motion based on a desired trajectory for the vehicle.

11. The vehicle of claim 1, wherein the desired chassis-level motion includes at least one of a speed, an acceleration, a yaw rate, a pitch rate, a roll rate, a yaw moment, a pitch moment, and a roll moment.

12. A vehicle, comprising:
    a vehicle body;
    road wheels that are connected to the vehicle body;
    a propulsion system that is operable to independently control propulsion torque to each of the road wheels;
    a steering system that is operable to independently control a steering angle of each of the road wheels;
    a braking system that is operable to independently control braking torque to each of the road wheels;

an active suspension system that regulates motion of the road wheels with respect to the vehicle body by independently controlling application of force to each of the road wheels; and a vehicle control module that is operable to determine a desired chassis-level motion, allocate a first portion of the desired chassis-level motion to one of the propulsion system, the steering system, the braking system, or the active suspension system, allocate a second portion of the desired chassis-level motion to another one of the propulsion system, the steering system, the braking system, or the active suspension system, different from the system to which the first portion was allocated, and output commands to cause operation in accordance with the desired chassis-level motion, wherein the first portion of the desired chassis-level motion and the second portion of the desired chassis-level motion are allocated using a cost function.

13. The vehicle of claim 12, wherein the cost function is based in part on energy efficiency.

14. The vehicle of claim 12, wherein the cost function is based in part on comfort.

15. The vehicle of claim 12, wherein the cost function is based in part on controllability.

16. A vehicle, comprising:
a vehicle body;
road wheels that are connected to the vehicle body;
a propulsion system that is operable to independently control propulsion torque to each of the road wheels;
a steering system that is operable to independently control a steering angle of each of the road wheels;
a braking system that is operable to independently control braking torque to each of the road wheels;
an active suspension system that regulates motion of the road wheels with respect to the vehicle body by independently controlling application of force to each of the road wheels; and a vehicle control module that is operable to determine a desired chassis-level motion, determine a first control strategy to achieve the desired chassis-level motion, determine a second control strategy to achieve the desired chassis-level motion, and select one of the first control strategy or the second control strategy for controlling operation of one or more of the propulsion system, the steering system, the braking system, or the active suspension system, wherein the selection of one of the first control strategy or the second control strategy by the vehicle control module is made using a cost function based on one or more criteria associated with the first control strategy and the second control strategy.

17. The vehicle of claim 16, wherein the one or more criteria include energy efficiency.

18. The vehicle of claim 16, wherein the one or more criteria include comfort.

19. The vehicle of claim 16, wherein the one or more criteria include controllability.

20. The vehicle of claim 16, wherein the vehicle control module is further operable to output commands to one or more of the propulsion system, the steering system, the braking system, and the active suspension system according to the selected one of the first control strategy or the second control strategy.

* * * * *